(12) United States Patent
Zdepski et al.

(10) Patent No.: US 7,012,963 B2
(45) Date of Patent: Mar. 14, 2006

(54) POSITIONING OF IMAGES IN A DATA STREAM

(75) Inventors: Joel W. Zdepski, Mountain View, CA (US); Wai-Man Lam, Union City, CA (US)

(73) Assignee: OpenTV, Inc., San Francisco, CA (US)

( * ) Notice: Subject to any disclaimer, the term of this patent is extended or adjusted under 35 U.S.C. 154(b) by 28 days.

(21) Appl. No.: 10/714,089

(22) Filed: Nov. 14, 2003

(65) Prior Publication Data

US 2004/0096002 A1 May 20, 2004

Related U.S. Application Data

(60) Provisional application No. 60/426,112, filed on Nov. 14, 2002.

(51) Int. Cl.
*H04N 7/18* (2006.01)
(52) U.S. Cl. .................... 375/240.27; 375/240.12; 375/240.16; 375/240.25
(58) Field of Classification Search ............................... 375/240.12–240.29
See application file for complete search history.

(56) References Cited

U.S. PATENT DOCUMENTS

| | | | |
|---|---|---|---|
| 5,649,032 A | 7/1997 | Burt et al. | |
| 5,691,768 A | 11/1997 | Civanlar et al. | |
| 5,867,208 A | 2/1999 | McLaren | |
| 5,995,146 A | 11/1999 | Rasmussen | |
| 6,366,617 B1 * | 4/2002 | Ryan | 375/240.25 |
| 6,522,694 B1 * | 2/2003 | Ryan | 375/240.25 |
| 2004/0086040 A1 * | 5/2004 | Bayrakeri et al. | 375/240.01 |

OTHER PUBLICATIONS

U.S. Appl. No. 09/494,067, filed on Jan. 28, 2000.

* cited by examiner

*Primary Examiner*—Andy Rao
(74) *Attorney, Agent, or Firm*—Meyertons Hood Kivlin Kowert & Goetzel, P.C.; Rory D. Rankin

(57) ABSTRACT

A method and mechanism for repositioning video images in a compressed data stream without requiring bit shifting. A P frame image is to be repositioned from an original position to an alternate position. The P frame image data is analyzed to determine whether the repositioning will result in the image data bit positions being changed with respect to the original image. In response to determining the bit positions will be changed, the original image data is modified by adding stuffing bits in the form of a stuffing macroblock to restore the image data to its original bit positions. The P frame is intra-coded and the stuffing macroblock is non-intra coded. A non-intra quantization matrix is selected such that upon decode the stuffing macroblock data does not adversely affect the final picture. Maintaining the original bits positions of the image data facilitates a straightforward copy of unmodified data from the original P frame to the new P frame.

20 Claims, 15 Drawing Sheets

| sbit (# stuffing bits needed) | code word | length of codeword % 8 | run, level, sign |
|---|---|---|---|
| 0 | "0000 1111" | 0 | run = 8, level = 1, sign = -1 |
| 1 | "0010 0111 1" | 1 | run = 10, level = 1, sign = -1 |
| 2 | "11" | 2 | run = 0, level = 1, sign = -1 |
| 3 | "0000 0011 101" | 3 | run = 14, level = 1, sign = -1 |
| 4 | "0111" | 4 | run = 1, level = 1, sign = -1 |
| 5 | "01011" | 5 | run = 2, level = 1, sign = -1 |
| 6 | "001111" | 6 | run = 3, level = 1, sign = -1 |
| 7 | "0001111" | 7 | run = 5, level = 1, sign = -1 |

FIG. 12

POSITIONING OF IMAGES IN A DATA STREAM

CROSS REFERENCE TO RELATED APPLICATIONS

This application claims benefit of priority to Provisional Application Ser. No. 60/426,112 filed Nov. 14, 2002.

BACKGROUND OF THE INVENTION

1. Field of the Invention

This invention is related to the field of video processing and, more particularly, to the repositioning of images in a video display.

2. Description of the Related Art

Banner advertisements have become increasingly popular and important in television broadcasts, interactive TV applications, Internet Web browsers, and other multimedia applications. These advertisements allow the display of advertisements (ads) to attract viewers for commerce, information, and other purposes. In an interactive application, a banner ad typically occupies a portion of a display on top of a background image. Frequently, the background may be encoded as an MPEG I frame and the banner ad encoded as either a bitmap or an MPEG P frame.

Whether a banner ad is encoded as a bitmap or an MPEG P frame, various problems or limitations may be encountered. For example, bitmap banner ads may have limited color resolution due to restrictions inherent in the receiving device, such as a set-top box on-screen display (STB OSD). In addition, because bitmaps may be encoded as JPEG images, additional processing time may be required for decompression of the image. On the other hand, a banner ad encoded as an MPEG P frame may have a much higher color resolution and can generally be decoded by the MPEG hardware in the receiving device. However, placement of an ad on the screen may be more difficult when using a banner ad encoded as an MPEG P frame. In the absence of a mechanism which allows the STB to move the MPEG P frame banner ad to a desired location, the P frame must generally be retransmitted for each new display position. Further, because the MPEG decoder being used may require a valid MPEG stream in order to properly decode the stream, the choice of new location for an MPEG P frame banner ad may be limited. For example, the choice of new locations may be limited to locations on a macroblock (MB) boundary. In addition, moving a P frame to a new location may result in a change in bit position of the image data macroblocks. In such a case, bit shifting would generally be required which is a slow computation process.

Accordingly, a method and mechanism for repositioning a banner ad or other image in a data stream is desired.

SUMMARY OF THE INVENTION

A method and mechanism for repositioning video images is contemplated. In one embodiment, an image is to be moved from an original position to an alternate position. The data describing the original image is stored in a first buffer. Reads and writes to the first buffer are generally performed on fixed boundaries. The method contemplates analyzing the image data to determine whether the desired repositioning will result in the image data bit positions being changed with respect to the original image. In response to determining the bit positions will be changed, the original image data is modified by adding new data to restore the image data to its original bit positions. The method further provides coding the new data such that upon decode the new data does not adversely affect the resulting image. The modified image data is written to a second buffer and image data which is not modified is copied from the first buffer to the second buffer.

In one embodiment, the image is represented by a P frame in an MPEG-2 based environment and the corresponding I frame represents a background against which the image is to appear. If it is determined that the bit positions of the P frame image will be altered due to repositioning, the method includes adding new data in the form a stuffing bits to those slices which include the image data. The method further includes generating new "empty" slices for those portions of the P frame not occupied by the image, modifying address increments of the first macroblocks of each image containing slice, appending the remaining image macroblocks to their respective slices, and filling out the remainder of the slices with skipped macroblocks. Further, in response to determining the vertical position of the image is altered, the method includes modifying the slice vertical position codes for those slices including the image data.

In one embodiment, the method includes coding the P frame image as intra data, coding the new data as non-intra data, and generating a non-intra quantization matrix which is configured to produce zero coefficients for the new data upon decode. Still further, the method contemplates calculating the amount of bit stuffing needed based upon particular boundaries. In one embodiment, bit positions are determined with respect to byte boundaries and calculations are performed on that basis.

Also contemplated is a mechanism configured to reposition video images according to the above described methods. In one embodiment, the mechanism comprises a general purpose processor configured to execute image repositioning program instructions. The mechanism includes a first buffer configured to store an original video image and a second buffer for storage of a modified version of the original image. In one embodiment, and original P frame image is stored in the first buffer. The mechanism receives data indicating a new desired position for the image. The mechanism analyzes the original data and determines whether the image bit positions within a byte will be changed as a result of repositioning the image. In response to determining the bit positions will be changed, the mechanism calculates a number of stuffing bits required to restore the image data to its original bit positions. A stuffing macroblock coded an non-intra data is then generated for each slice which includes the image data. A non-intra quantization matrix is generated which is configured to negate the visual impact of the stuffing macroblock. The mechanism is further configured to modify the vertical position codes of the image slices and modify the first macroblocks of the image data in each slice to reposition the image to the new location.

Numerous other embodiment and features of the method and mechanism are described herein.

BRIEF DESCRIPTION OF THE DRAWINGS

Other objects and advantages of the invention will become apparent upon reading the following detailed description and upon reference to the accompanying drawings in which:

FIG. 12 illustrates one embodiment of a table depicting stuffing bit codewords.

Figure 1:
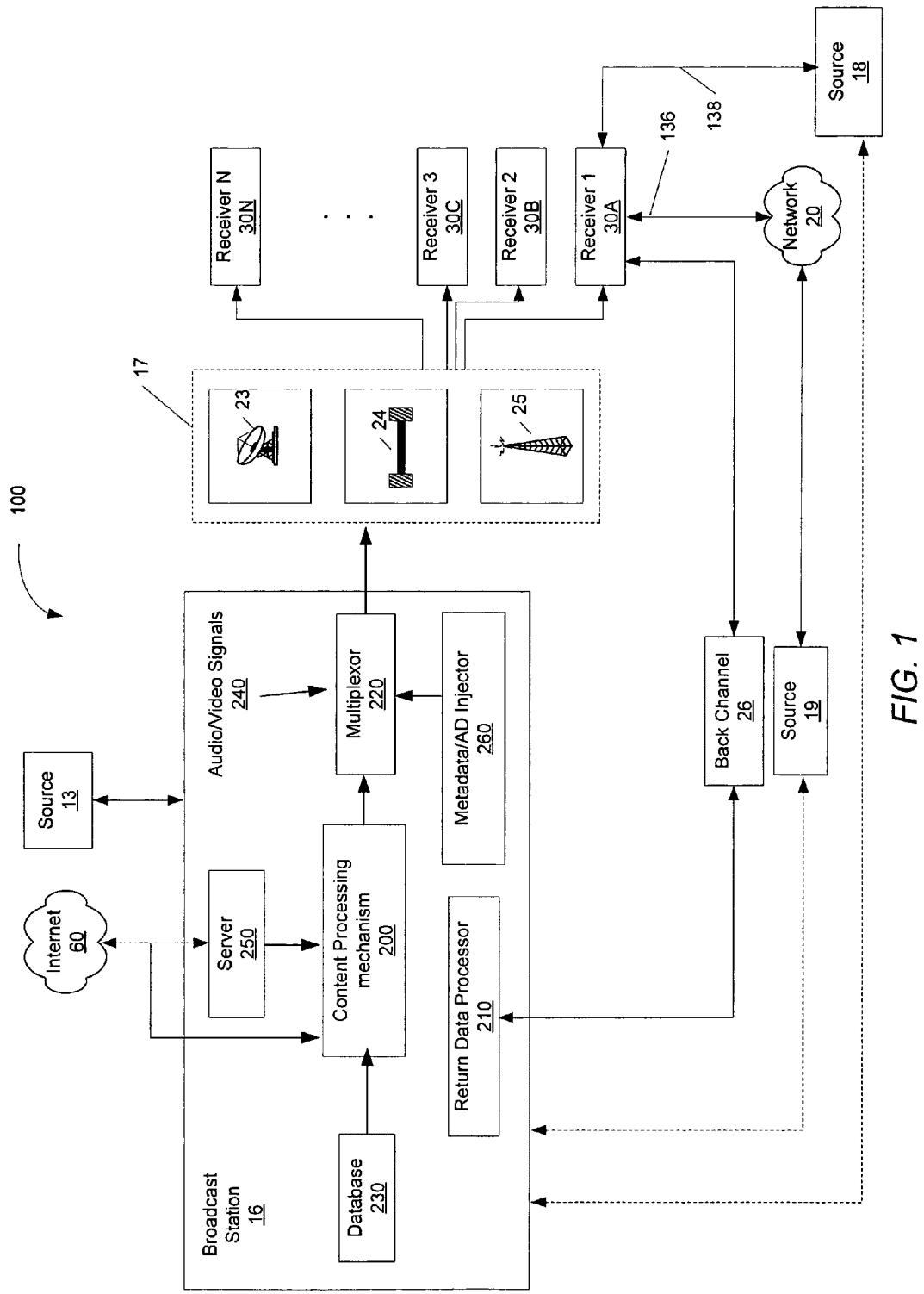
FIG. 1 illustrates one embodiment of a television broadcast system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DESCRIPTION

System Overview

Referring to FIG. 1, one embodiment of a television system 100 is shown. In the embodiment shown, receiving devices 30A–30N are coupled to several sources of programming and/or interactive content. Elements referred to herein with a particular reference number followed by a letter will be collectively referred to by the reference number alone. For example, receiving devices 30A–30N will be collectively referred to as receiving devices 30. Receiving devices 30 may comprise any number of suitable devices, examples of such devices include a set-top box (STB), a television (TV), a video cassette recorder (VCR), a personal video recorder (PVR), a personal digital assistant (PDA), a personal computer (PC), a video game console, or a mobile/cell phone.

Included in the embodiment of FIG. 1 is a broadcast station 16 coupled to receiver(s) 30 via a transmission medium 17 and back channel 26. In addition, receiver(s) 30 are coupled to a source 18 and source 19 via a network 20. Further, broadcast station 16 is coupled to a remote source 13, and Internet 60. Transmission medium 17 may comprise a satellite based system 23, a cable based system 24, a terrestrial or multiple multi-point distribution service (MMDS) based system 25, a combination of these systems, or some other suitable system of transmission.

In the embodiment of FIG. 1, broadcast station 16 may include databases, application servers, other audio/video sources, or other data sources. In one embodiment, content may be created at a source which may include an authoring station configured to create such content. An authoring station may include a computer workstation configured with software which aids in the development of interactive content. An authoring station may be part of broadcast station 16 in which case the conveyance of the created content may be through a local computing network, or similar configuration. Alternatively, an authoring station may be remotely located 13 from broadcast station 16. In an embodiment where authoring station is not directly coupled to broadcast station 16, the content created by a source 13 may be conveyed to broadcast station 16 via Internet, broadcast, cable, etc. In some cases, content created by at a remote location 13 may first be transferred to a storage medium, such as a compact disc (CD), digital versatile disc (DVD), or flash memory device, and transported to broadcast station 16 via more conventional means where it may be stored in a database or other storage device.

Subsequent to its receipt and/or creation, content may be delivered to receiver(s) 30 through a broadcast transmission network. This network consists essentially of a broadcast station 16 which assembles the content from various sources and processes the content as appropriate (e.g., digitizes, compresses, packetizes), and a transmission network 17 which receives the content from broadcast station 16 and conveys it to receiving device(s) 30. A second delivery mechanism may include a direct point-to-point connection 138 between receiver(s) 30 and source 18 which may be some type of server. This connection 138 may be made via an ordinary telephone line, cable, wireless, or otherwise. A third delivery mechanism may also be a point-to-point connection 136, but transmission of the content from a source 19 to receiver(s) 30 is made via one or more shared networks (e.g., over the Internet). FIG. 1 also illustrates broadcast station 16 may be optionally coupled to source 18 and/or source 19. Such a coupling may enable broadcast station 16 to work cooperatively with source 18 or source 19 in conveying content to receiver(s) 30. Also illustrated in FIG. 1 is a back channel (or return path) 26 by which receiver(s) 30 may convey to and/or receive data from broadcast station 16. Back channel 26 may comprise a telephone line, cable, wireless, or other connection. It is noted that because data may be routed through many different shared networks, it may be read, stored and written many times as it is transmitted from a source to receiver(s) 30.

In the example shown, the broadcast station (head-end) 16 includes an application server 250 and a database 230 which may contain previously created interactive content. In addition, a content processing mechanism 200 and server 250 are coupled to the Internet 60. Database 230, server 250, Internet 60, and source 13 are coupled to content processing mechanism 200 which is configured to process received content and convey the processed content to a multiplexor 220. Multiplexor is coupled to receive audio/video signals 240 and is further coupled to a metadata/AD injector 260 which is configured to provide advertisements, images, and/or other data for transmission. Multiplexor 220 multiplexes the received signals and conveys the multiplexed signal to network communications operator 17 where it is subsequently conveyed to one or more receiving devices. While the above description describes a source of interactive content as being at a broadcast station 16, in an alternative embodiment database 230 and content processing mechanism 200 may reside at the location of a network communications operator. An example of such an alternative embodiment may be a cable station which inserts interactive content into a broadcast signal prior to transmission.

Figure 2:
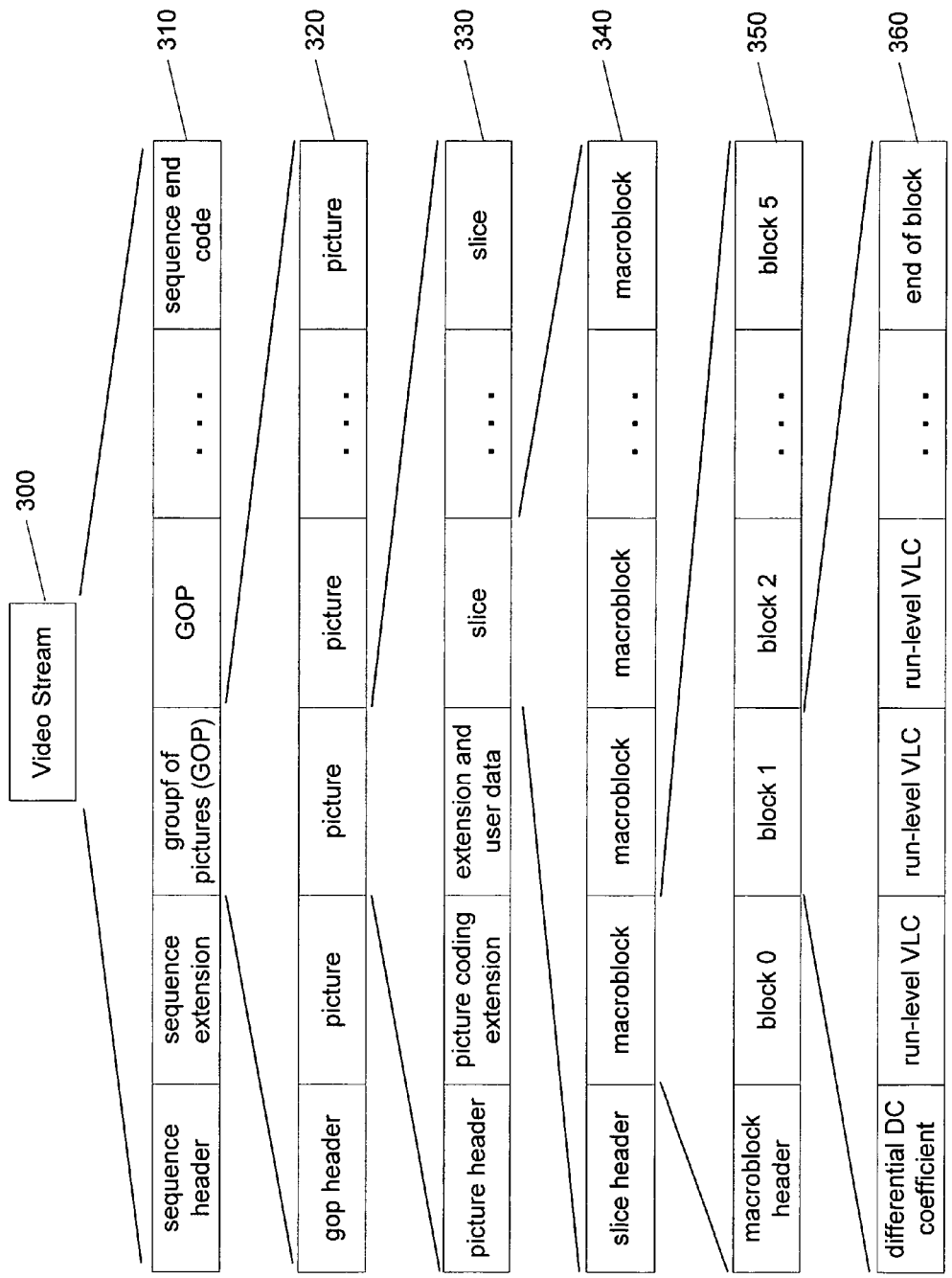
FIG. 2 depicts one embodiment of a video stream.

Turning now to FIG. 2, one embodiment of a video stream 300 to which the method described herein may be applied is illustrated. Those skilled in the art will appreciate that broadcast systems may transmit MPEG data in the form of transport streams which include packetized elementary streams and other systems may utilize other techniques for transmitting MPEG data streams. Video stream 300 generally conforms to the MPEG-2 standard, though alternative stream formats utilizing different compression techniques are contemplated as well. In the example of FIG. 2, video stream 300 is shown to include a sequence 310 comprising a sequence header, extension, group of pictures (GOP), and sequence end code. GOP 320 includes a header and one or more pictures. Picture 330 includes a header, coding extension, extension and user data, and one or more slices. A slice 340 is illustrated and includes a header and a plurality of macroblocks. Macroblock 350 includes a header and a plurality of blocks. Finally, a block 360 is shown to include a differential DC coefficient, run-level variable length codings (VLC), and an end of block.

Figure 3:
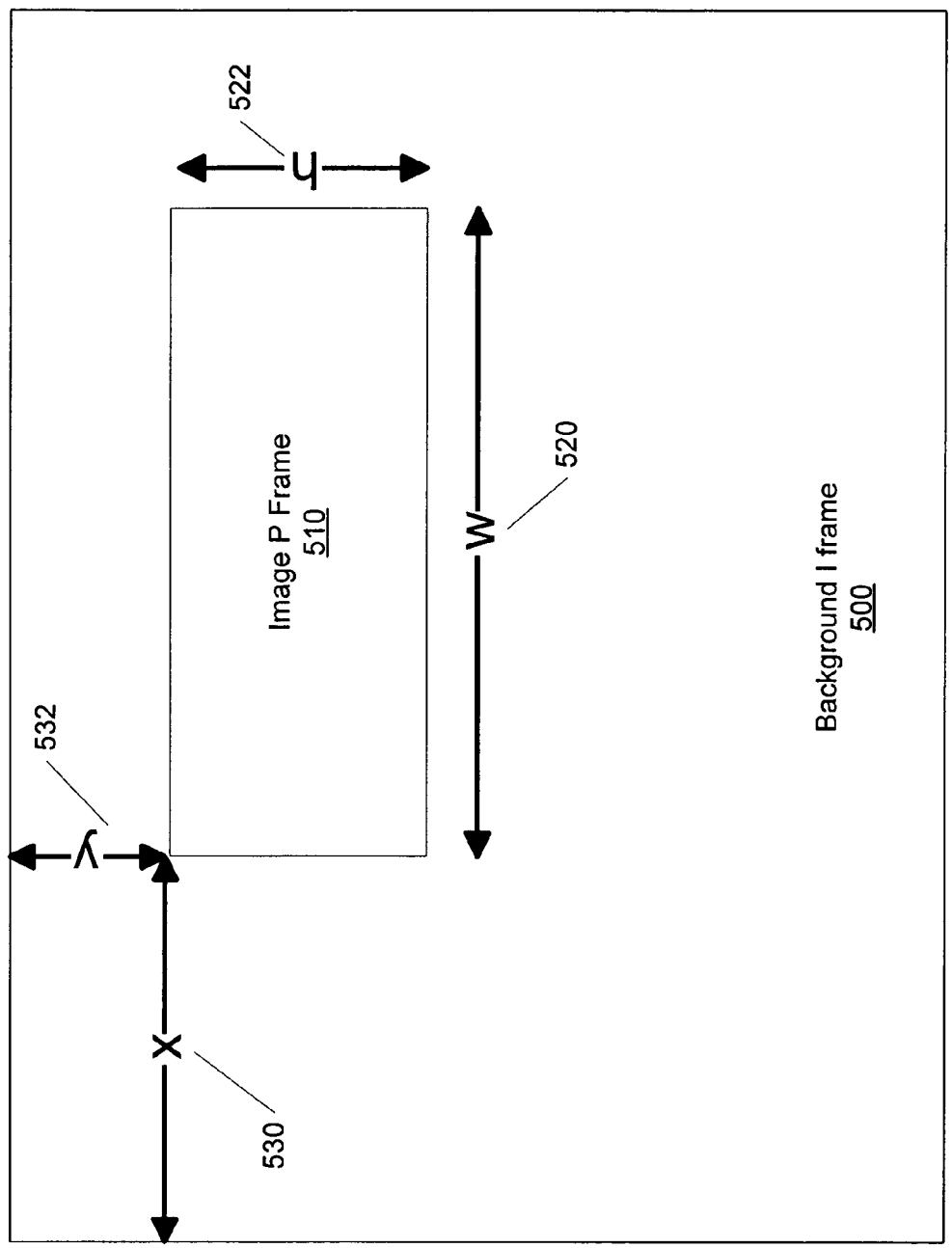
FIG. 3 illustrates a combined P frame and I frame.

As discussed above, an MPEG data stream may include a banner ad or other image transmitted in the form of a P frame. FIG. 3 depicts one embodiment illustrating the relationship between an image P frame 510 and a Background I frame 500. Banner ads and other images are typically represented as a rectangular image with a width w pixels (520) and height h pixels (522). In an embodiment where the image is encoded in a P frame, both w and h may be specified in increments of macroblock length (i.e., 16 pixel increments). Thus w % 16=h % 16=0 where % is the modulus operation. In addition, such images may further include an x coordinate (530) and y coordinate (532) indicating the upper left corner of the image. Frequently, the upper left corner of the image may coincide with the starting position in raster scan order of the P frame image. In one embodiment, the P frame image 510 is encoded using only intra-coded macroblocks. It is noted that the background image need not be conveyed in an I frame. Rather, any valid reference frame may be utilized to convey the background image.

Figure 4:
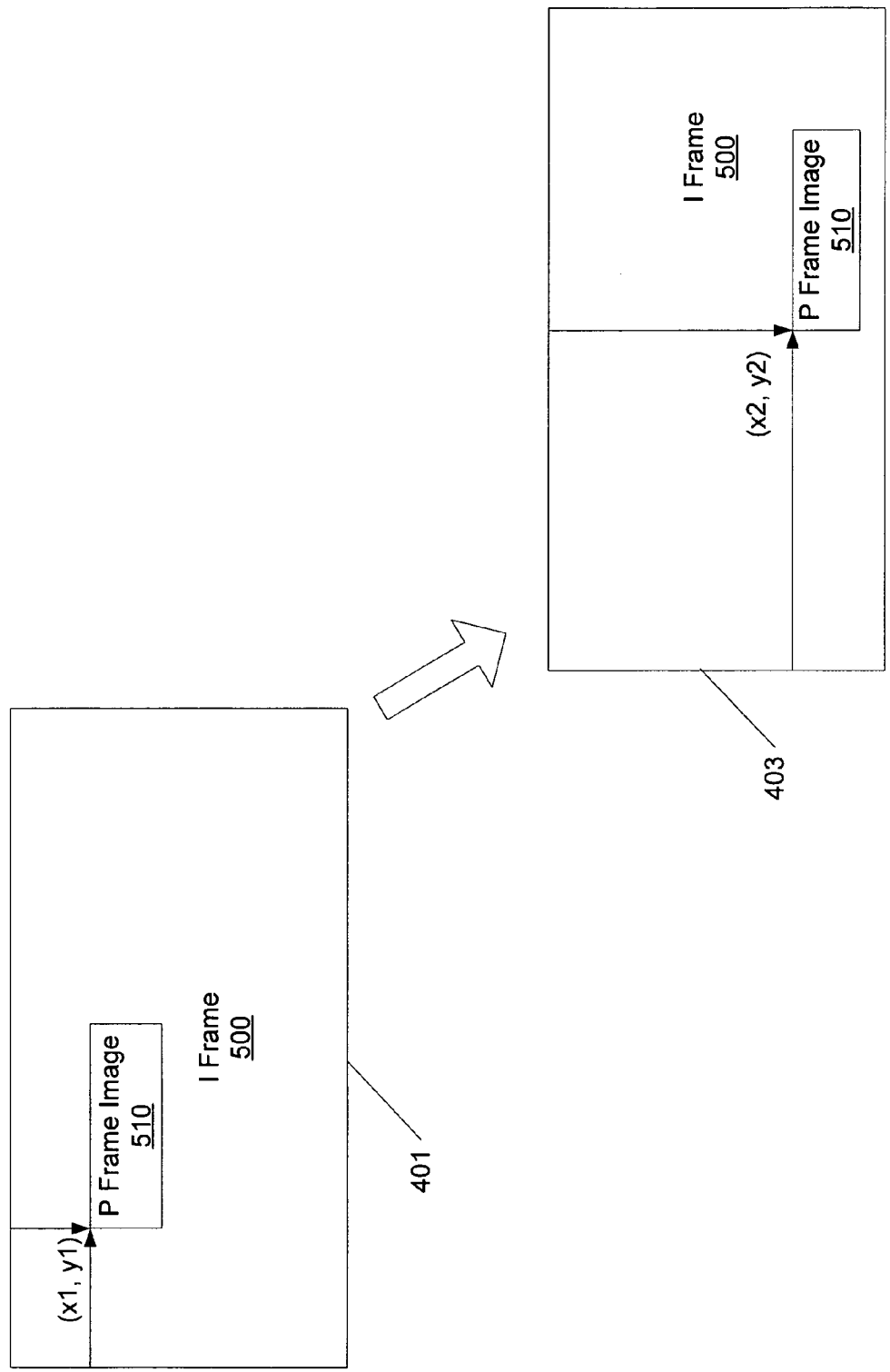
FIG. 4 depicts the repositioning of a P frame image.

FIG. 4 illustrates the repositioning of a P frame image. A first picture 401 is shown which depicts the original location of the P frame image 510 with respect to an I Frame 500, and a second picture 403 shows the image 510 after having been repositioned. In the example shown, the first image 401 shows P frame 510 positioned at coordinates (x1, y1) with respect to the I frame 500. The second image 403 illustrates the same image as 401, with the exception being that the P frame image 510 has been repositioned to a new location (x2, y2). In one embodiment, the first image 401 represents an image received by a client device (such as a television set-top box) and the second image represents the image after the client device has repositioned the P frame image 510 to the new location (x2, y2). However, while the discussion that follows may refer to repositioning by a set-top box, it is to be understood that repositioning of the P frame image may occur anywhere within a transmission chain and by any suitable device configured to perform such repositioning in accordance with the method and mechanism described herein.

In one embodiment, a coordinate system may be established such that the upper left corner of the picture is designated by the coordinates (x, y)=(0, 0). New coordinates may be specified in increments best suited to the particular data format involved. In the case of MPEG-2, new coordinates may be specified in increments of macroblocks. For example, while the pixel resolution of a picture may differ depending upon the particular system configuration, macroblocks typically correspond to a region of 16×16 pixels. Consequently, coordinates of (x, y)=(2, 4) may refer to pixel location (32, 64). For purposes of discussion, such a system will be assumed. However, those skilled in the art will appreciate that the methods and mechanisms described herein may be adapted to other systems as well. In addition, while the discussion may describe MPEG-2 frame pictures in a television broadcast system, other systems and compression techniques are contemplated as well. For example, video may be conveyed via the Internet, via other computer networks, or within a home DVD system. Further those skilled in the art will appreciate that the methods and mechanisms described herein may also be adapted to an MPEG-2 field picture if desired. Numerous such alternatives are both possible and are contemplated.

Figure 5:
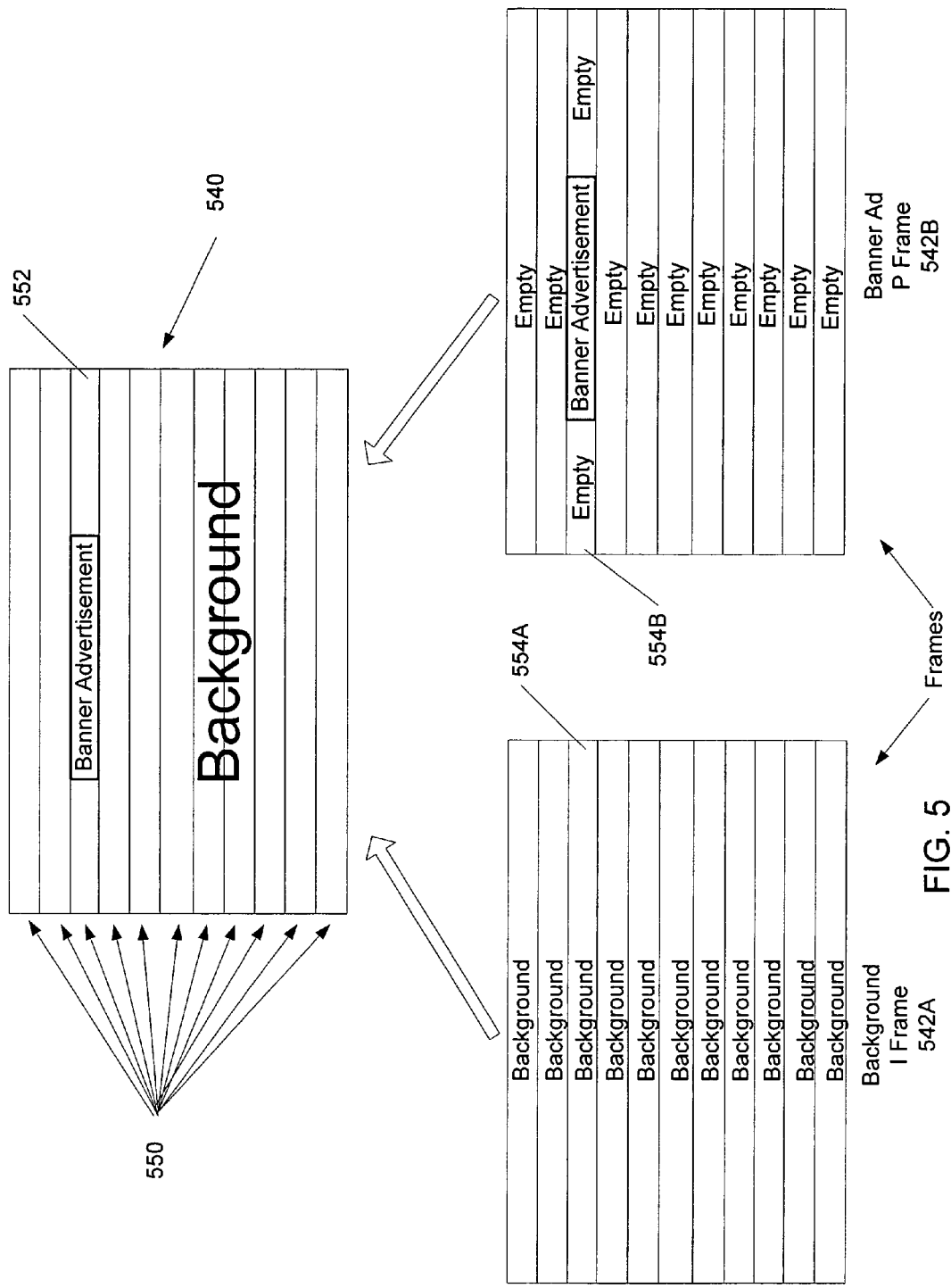
FIG. 5 illustrates one embodiment of a picture and frames.

Turning now to FIG. 5, a more detailed perspective of an MPEG type picture 540 is provided. In the example shown, picture 540 includes a banner advertisement superimposed upon a background. However, while it may not be apparent to a viewer, picture 540 may actually be composed of a number of image "slices" 550. The banner advertisement in this example is shown to be included in a single slice 552, though such images may be included in multiple slices. Still further, picture 540 may be generated from two separate image frames. In FIG. 5, the background of picture 540 is provided by an MPEG I-Frame 542A, and the banner advertisement image is provided by an MPEG P-Frame 542B. Generally speaking, each of frames 542A–542B include data describing a same number of slices which correspond to the slices 550 of picture 540. However, each of frames 542A–542B may include different amounts of data and may represent those slices in different ways.

As can be seen in FIG. 5, P frame 542B describes a number "empty" slices which do not include image data corresponding to the banner advertisement. In addition, the banner advertisement shown in P frame 542B does not fill the entire slice 554B in which it is included. On the other hand, in this particular example, I frame 542A includes background image data in every slice. Generally speaking, when frames 542A–542B are combined, those areas identified as "empty" in P frame 542B will reflect the data of corresponding locations in I frame 542A. On the other hand, that portion of slice 554B which includes the banner advertisement data will be combined in some way with the corresponding portion of slice 554A. In this manner, picture 540 may be generated.

While it is possible to combine a banner advertisement image with an underlying background with varying degrees of opacity and other visual effects, it may be desired that the banner advertisement image completely cover the corresponding locations of the background. In an embodiment where the banner advertisement is to simply cover the corresponding location of a background image, the banner image may be encoded such that the visual content of the background image is not utilized in generating the banner advertisement image in the resulting picture. In an embodiment using MPEG encoding, this may be accomplished by encoded the banner image using only intra-frame encoded macroblocks. In this manner, the banner image macroblocks simply replace the corresponding macroblocks of the background image.

Figure 6:
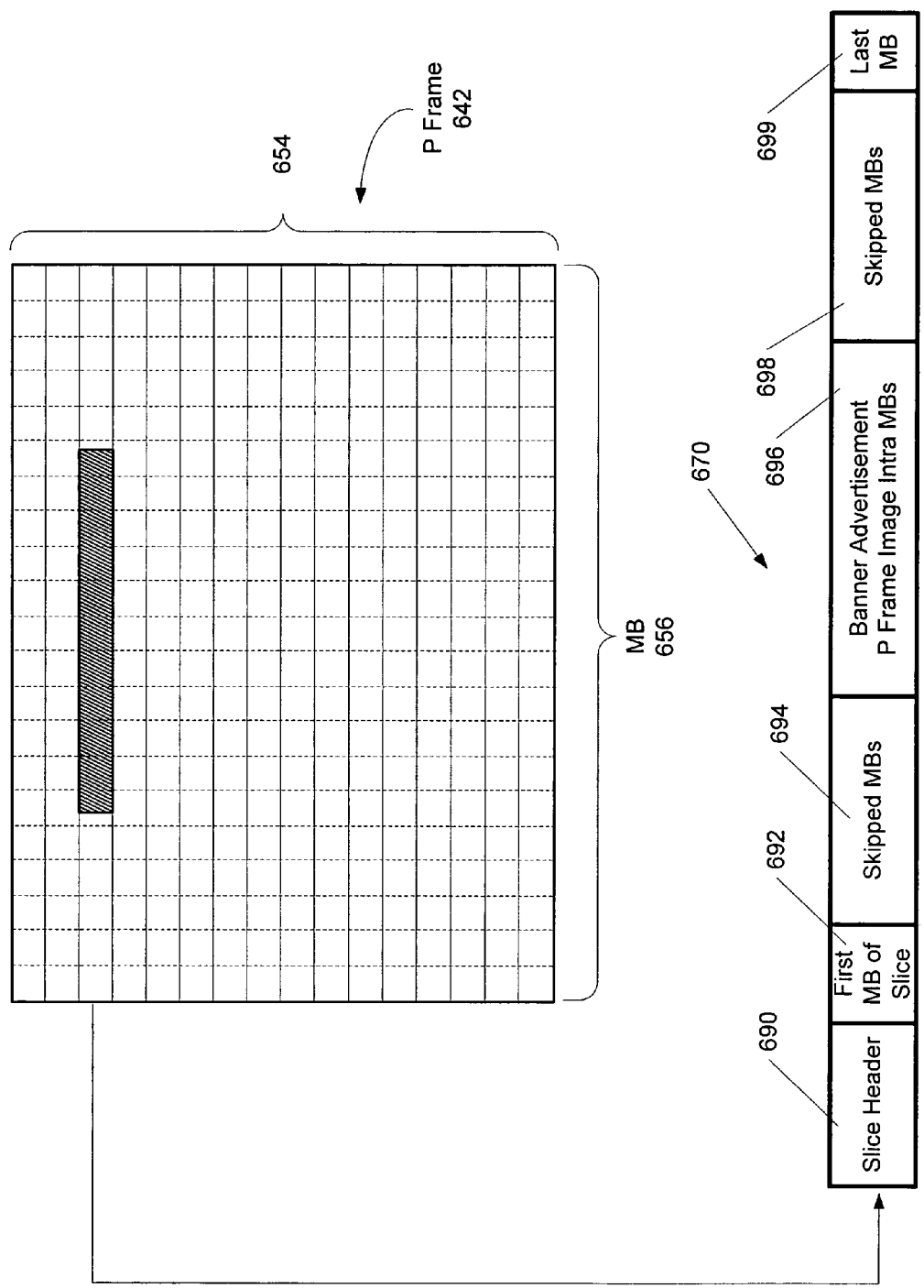
FIG. 6 illustrates one embodiment of a frame and slice.

FIG. 6 illustrates one embodiment of an MPEG P frame 642. As already discussed, P frame 642 is shown to be partitioned into slices 654. In addition, each of the slices 654 is shown to be further partitioned into macroblocks 656. One slice 670, in this case the slice which includes an image 680, is shown in greater detail. In the example shown, the slice 670 includes a header 690, a first macroblock 692, a number of skipped macroblocks 694, image macroblocks 696, further skipped macroblocks 698, and a last macroblock 699. Those skilled in the art will appreciate that skipping of macroblocks 694 may be accomplished by setting a macroblock address increment of the first macroblock of image macroblocks 696 to a suitable value. In this manner, it is not necessary to explicitly include data in the encoded P frame for each of the skipped macroblocks. In the example of FIG. 6, skipped macroblocks 694 may correspond to a distance from the left side of a picture where it is desired to position the banner advertisement 680.

Figure 7:
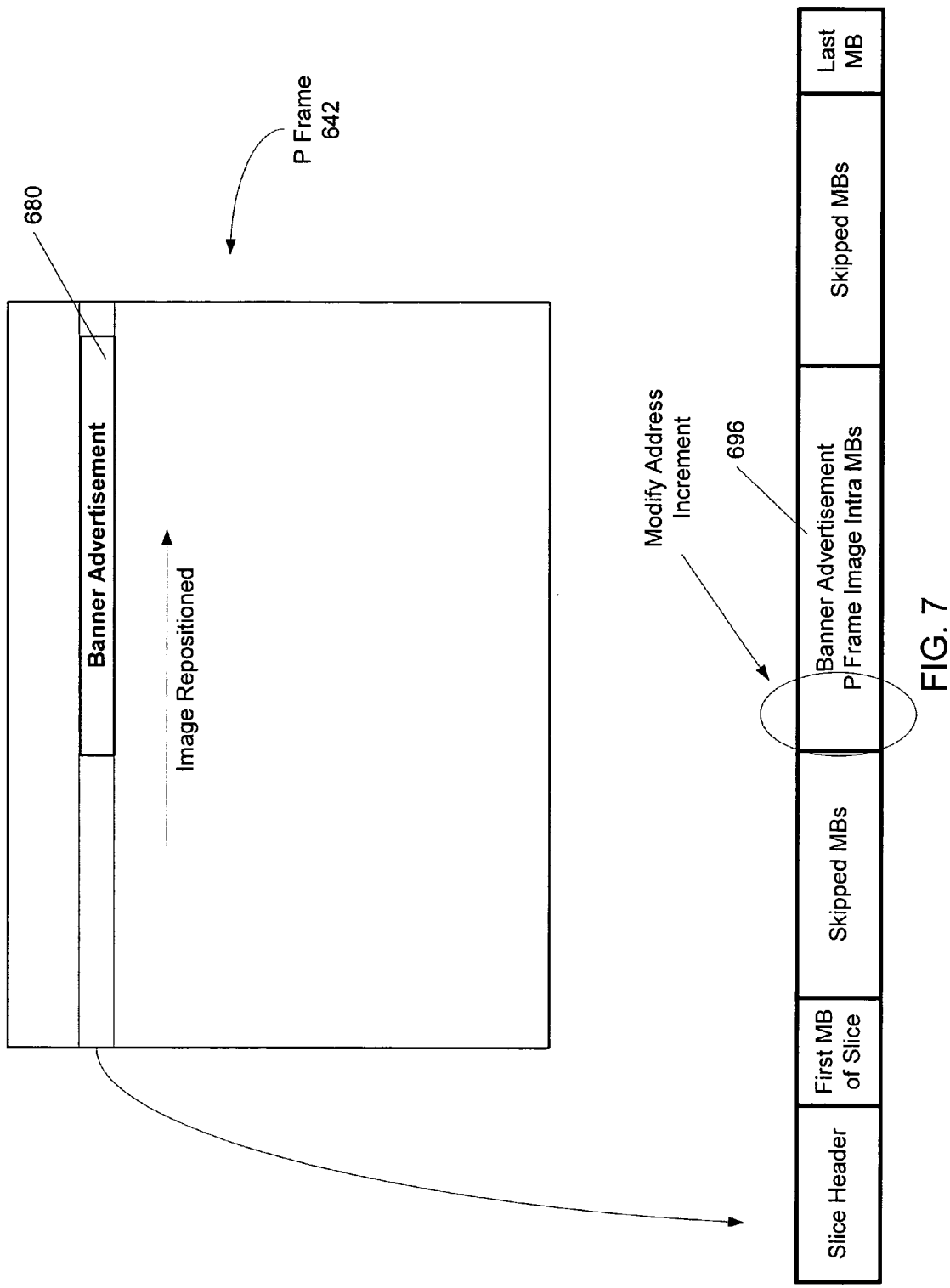
FIG. 7 illustrates repositioning of an image and modification of a slice.

FIG. 7 illustrates a repositioning of the banner advertisement 680 of FIG. 6. FIG. 7 shows the banner advertisement is repositioned further to the right. One method for repositioning the image as shown in FIG. 7 is to modify the macroblock address increment of the first macroblock of the image date 696. For example, assume the original macroblock address increment indicated that N macroblocks 694 were skipped as depicted in FIG. 6. If a position 20 macroblocks further from the left side of a picture were desired (i.e., repositioning horizontally to the right), then the macroblock address increment may be modified with a value to reflect N+20 macroblocks. The remainder of the slice may be generated as appropriate to reduce the number of skipped macroblocks to the right of the image 680. While such a technique may seem relatively straightforward, additional challenges may present themselves as described below.

In a system where repositioning of images such as described above is desired, certain limitations may be present based upon the nature of the system itself. For example, in the context of a television system, the following steps may take place. A television head-end may generate and transmit a broadcast data stream which includes MPEG or other compressed video data. Subsequent to receiving the broadcast data stream, a set-top box may de-multiplexed the data into its component parts. One of these component parts may include the MPEG encoded video stream. In the simplest case, the received MPEG data may simply be buffered and decoded as appropriate. However, where it is desired to modify the position of images in P frames as described above, an additional step is required. In one embodiment, the received MPEG encoded data is stored in a buffer. A repositioning mechanism (hardware, software, or a combination) may then read the encoded data from the buffer, modify the encoded data to reposition the image, and re-store the modified encoded data. Subsequently, the modified data may be decoded.

Because the repositioning mechanism described above will typically include the use of conventional hardware and/or software components, any limitations inherent in such components must be considered. One such limitation which may be present involves the manner in which computing devices access data. Generally speaking, processing units are designed to address memory devices on byte boundaries. Accesses to particular bits within a given byte generally include a read of at least the entire byte followed by manipulations (such as shifting) to access the desired bits. On the other hand, an MPEG or other data stream typically includes identifiable units of data that may or may not be byte aligned. Because the repositioning mechanism may be constrained by byte aligned data access (read and/or writes), challenges in processing an MPEG or other data stream may arise.

Figure 8:
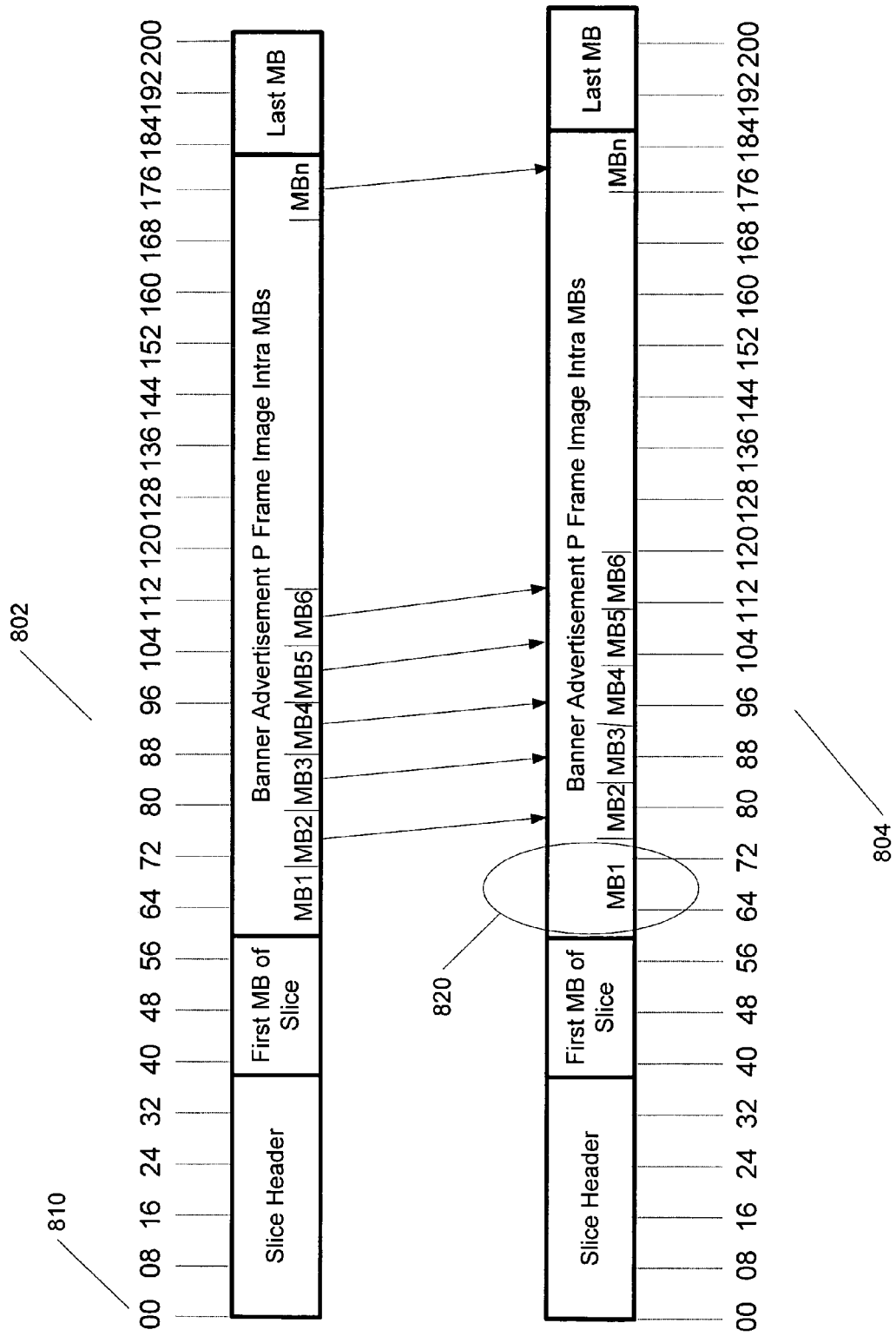
FIG. 8 illustrates one embodiment of a modified slice.

FIG. 8 illustrates one embodiment of how addressing constraints of a repositioning mechanism may affect the repositioning of a P frame image. In the embodiment shown, a bit stream representative of a slice 802 prior to repositioning an included image is shown. Also shown is a slice 804 which represents the bits stream after being modified to reposition the image included therein. For ease of discussion, it is assumed that the original slice 802 is stored in a first buffer and the modified slice 804 is stored in a second buffer. However, the use of two separate buffers is not required. The overwriting of the original data with the new data is contemplated as well. In such a case, the description of two separate buffers may still be used even though most or all of the same storage locations are being reused. Also depicted are address locations (in decimal) 810 of the corresponding buffers which generally serve as a reference for bit positions within each slice.

In one embodiment, the data depicted in FIG. 8 uses variable length coding. For example, assuming the data is MPEG-2 encoded, macroblock address increments are variable length coded. Other compression techniques may use variable length coding in different ways. Assume, as in FIG. 7, a banner advertisement is to be repositioned horizontally toward to right. In one embodiment, this may be accomplished at least in part by modifying 820 the macroblock address increment (MBAI) of the first macroblock of the image (MB1) as shown in FIG. 8. In an embodiment where the MBAI uses variable length coding, modifying the value represented by the MBAI may change the number of bits used to represent the MBAI as well. Consequently, all macroblocks following the modified MB1 in slice 804 may be shifted subsequent to changing the number of bits in MB1.

Assuming macroblocks MB2–MBn of slice 804 remain unchanged, it may be desirable to simply copy these blocks from the original slice 802 to the new slice 804. However, because shifting has changed the bit positions of the data, a straightforward copying may not be possible. For example, after copying the slice header, first MB of the slice, and newly modified MB1 to the new slice 804, data for MB2 in the new slice begins at bit position 75. As the mechanism likely addresses data on byte boundaries, the mechanism may write a byte of data to location 75 of slice 804 with the last 5 bits of the byte including the MB2 data to be copied. Bits 72–75 may be masked to prevent overwriting the MB1 data. However, in the original slice 802, the data for MB2 begins at bit position 70. Consequently, there is not straightforward way of reading a byte of data such that the last five bits of the byte include the first five bits of MB2. A byte read from location 64 in slice 802 will have the first two bits of MB2 in the last two bit positions of the byte. Therefore, a read of at least two bytes from slice 802 (reads to locations 64 and 72) followed by a left shift of the bits would be required to move the first five bits of MB2 into the last five bit positions of a byte. Similar shifting would be required for the remaining macroblocks as well.

Figure 9:
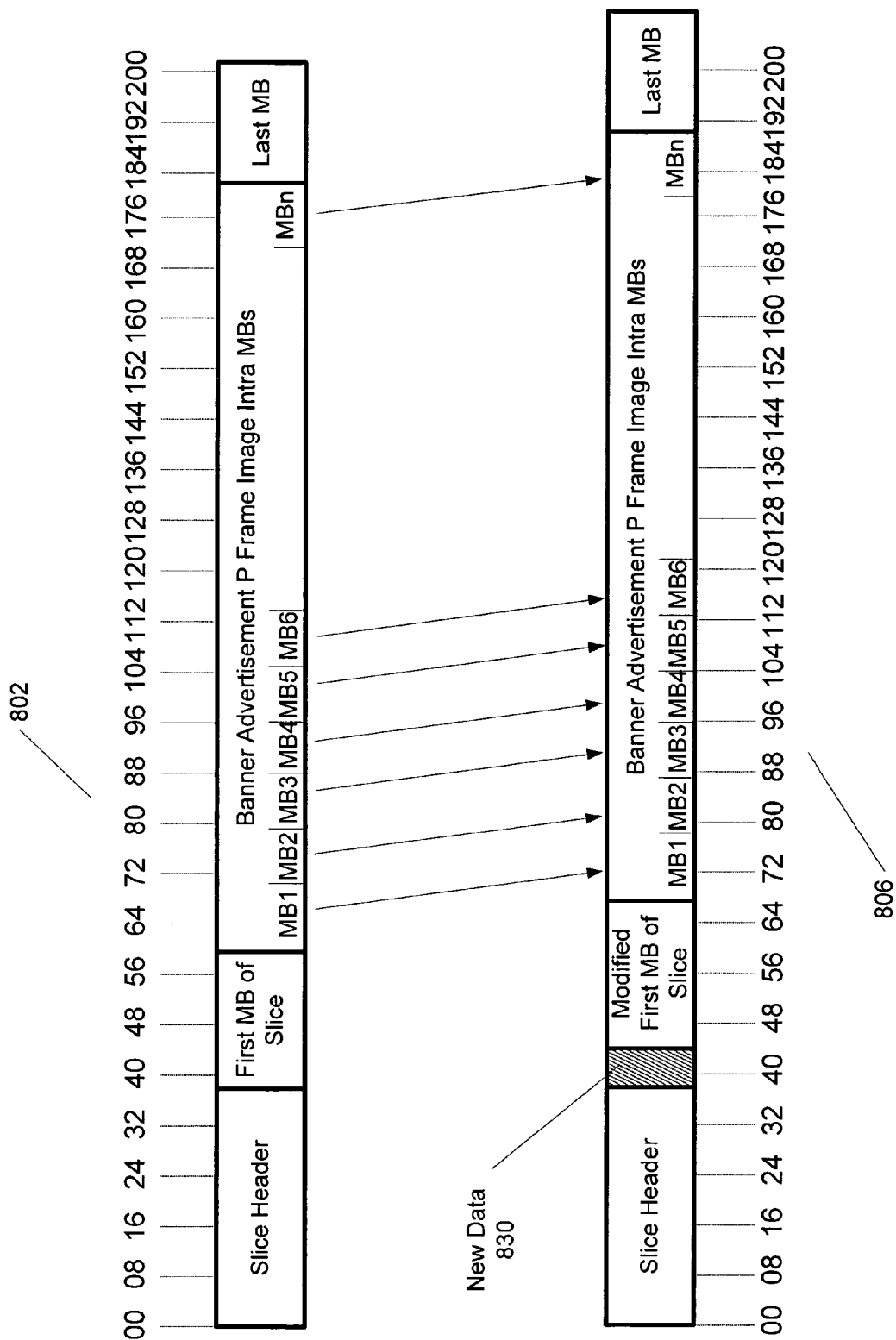
FIG. 9 illustrates one embodiment of a modified slice.

While reading and shifting the data as described above is one means of achieving the desired slice 804, an approach which does not require shifting bits may be desirable. FIG. 9 illustrates a method which does not require bit shifting. As the shifting problem illustrated in FIG. 8 arises from a change in relative bit position of the data to be copied, the solution includes restoring the data to its original relative bit position by adding new data to the modified slice. So, for example, if the original data to be copied began at bit position two within a byte and a modification has shifted this data to bit position six, then the addition of four bits prior to the data will restore it to bit position two. Restoring the bit positions of the data will allow for a straight copy of most of the data from the original slice to the new slice. In this manner, the processing involved in repositioning images may be made more efficient.

In the modified slice 806 of FIG. 9, new data 830 ("stuffing bits") has been added to the slice to restore the macroblock data MB1–MBn to its original bit positions. In this example, the first MB of the slice 806 has been modified and will be discussed below. However, as can be seen in FIG. 9, maintaining the data in its original bit positions facilitates a straight copy from the original slice 802 to the new slice 806. For example, data from the original slice beginning at locations 64 may be directly copied to the new slice beginning at location 72 with no shifting needed. Copying of the first portion of macroblock MB1 from the original slice 802 to the new slice 806 may be accomplished by a read from original slice location 56 followed by a write to new slice location 64 with appropriate masking.

In order to reposition a P frame image while still maintaining a valid bit stream, and not adversely, or materially, affecting the visual impact of the resulting image, various factors must be considered. For example, if additional data (e.g., macroblocks) is added to the P frame image, portions of the resulting picture which were not intended to be changed could be altered. Therefore, efforts must be undertaken to achieve the desired result without creating the above problems. In one embodiment, P frame images are intra-coded and any new data added to the frame is non-intra-coded (inter-coded). The added data is further coded such that the corresponding macroblock data coefficients will decode with either zero coefficients, or coefficients that do not otherwise adversely affect the resulting picture. In other words, a resulting image may be deemed to be non-materially affected if the added data either has no effect on the resulting picture or has an effect which is imperceptible under ordinary viewing conditions, or is otherwise visually acceptable.

Figure 10:
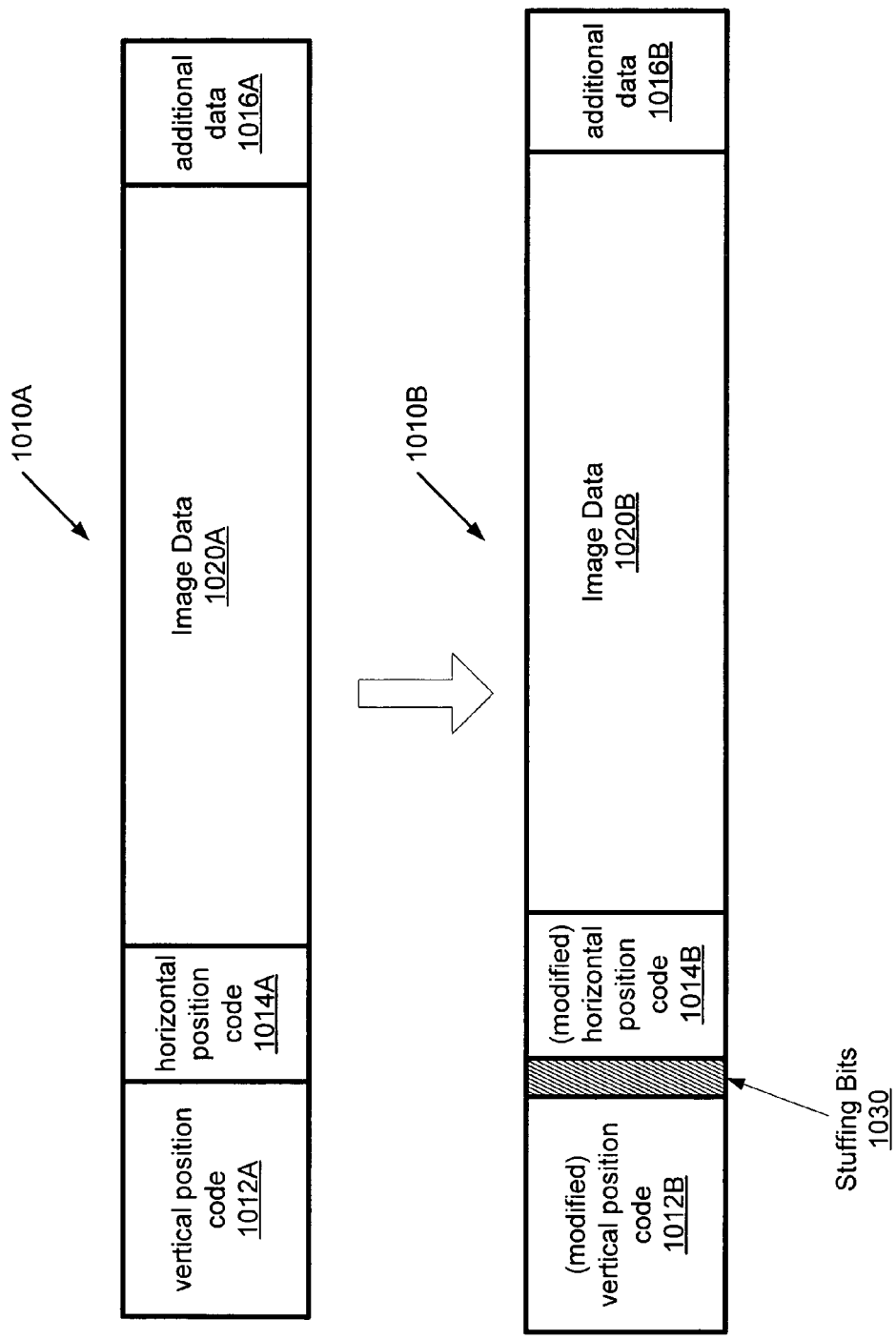
FIG. 10 illustrates one embodiment of bit stuffing.

FIG. 10 depicts the method more generally and illustrates that it may be applied to video data other than MPEG encoded data. Similar to FIG. 9, FIG. 10 illustrates a slice of video data before 1010A modification and after 1010B modification. In the embodiment shown, the video data represents a slice which may correspond to a horizontal slice across a video display. Original slice 1010A includes a vertical position code 1012A, horizontal position code 1014A, image data 1020A, and optionally additional data 1016A. Vertical position code 1012A may be used to indicate the vertical position within a picture of the slice 1010A. While the vertical position code is illustrated as being at the beginning of the slice 1012A, other embodiments may include this data elsewhere. In an embodiment utilizing MPEG encoding, a vertical position code may be included within a given slice header.

Also illustrated in slice 1010A is a horizontal position code 1014A which may be used to position image data 1020A horizontally. For example, in one embodiment the image data 1020A itself may not include horizontal positioning information. In such an embodiment, the horizontal position code 1014A may then serve to indicate a distance from the left side of a picture that the image 1020A starts. Alternatively, image data 1020A may also include horizontal positioning information—either relative or absolute. Where absolute position codes are used, all such codes must generally be modified to reflect any repositioning. On the other hand, where relative position codes are used, it may be sufficient to modify a first of such position codes. For example, in an MPEG based system the image data 1020A comprises one or more macroblocks, each of which includes a relative horizontal position code in the form of a macroblock address increment value, modification of the first macroblock address increment may serve to reposition that and all following macroblocks in the slice. Additional data 1016A may represent skipped macroblocks in an MPEG system, or any other data suitable to the particular encoding technique.

As already noted, variable length codes are used in MPEG encoding and other encoding techniques. Consequently, a modification of a display code which alters the original bit positions of image data may result in a need to perform one or more shift operations to properly store the modified data. In the discussion above, a modification of a horizontal display code (i.e., the MPEG macroblock address increment) was described. However, it is noted that variable length codes may be used in other ways as well and such systems may utilize the method and mechanism described herein. For example, in a system which encodes vertical position codes using variable length coding, added data may be used to restore image data to an original bit position.

In FIG. 10, slice 1010B shows the original slice after modification to correct for a change in length of a variable length code. As already described, "stuffing bits" are used if necessary to reposition image data to an original bit position. In the example shown, both the vertical 1012B and horizontal 1014B position codes have potentially been modified to reposition the image. It is noted that stuffing bits 1030 may be used to correct for changes in any number of variable length codes which occur within the slice 1010B. Still further, the stuffing bits may generally appear anywhere within the slice as long as they precede the data to be repositioned.

Figure 11:
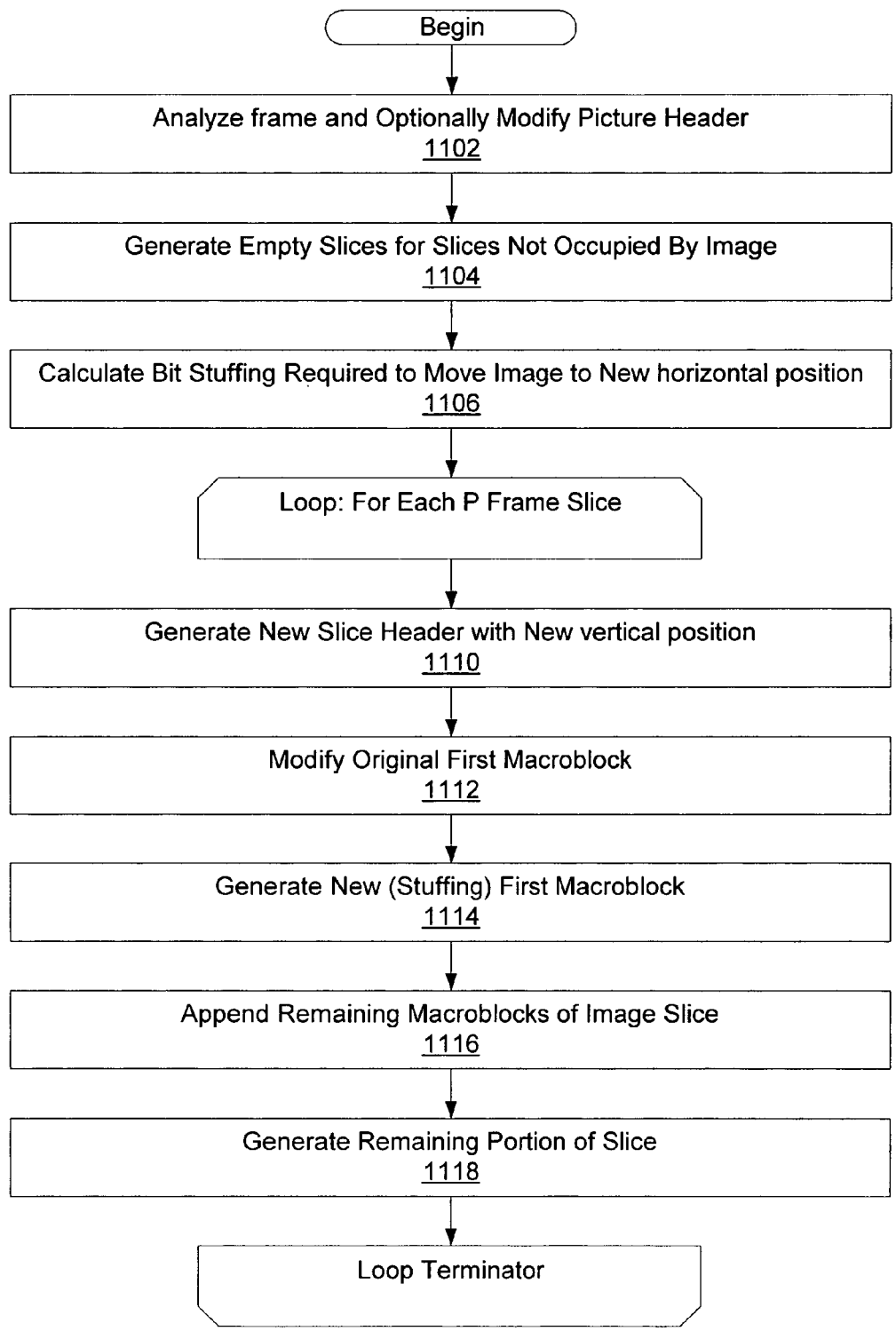
FIG. 11 illustrates one embodiment of a method for repositioning an image.

Turning now to FIG. 11 and following, a particular embodiment directed to MPEG-2 based systems will be discussed. FIG. 11 provides an overview of a method for repositioning images which encoded in MPEG P frames. In one embodiment, the P frame includes an image which is intra-coded. During processing of the P frame, the P frame data is analysed (block 1102) and the picture header of the frame may be modified. In one embodiment, modification of the picture header may be performed if it is determined that repositioning of the image will result in the corresponding data being moved to a different bit position. Generally speaking, the repositioning mechanism will receive new position information (e.g., coordinates x, y) for repositioning the image. By comparing the new position information to the original position information it may be determined that a change in bit position will result.

If it is determined that a change in bit position would result from the repositioning, then additional data in the form of "stuffing bits" will be added to restore the data to its original bit positions. To prevent the stuffing bits from adversely impacting the resulting picture, the stuffing bits are non-intra encoded and modification of the picture header may be required. In one embodiment, the picture header may be modified to add a non_intra_quantizer matrix which is configured to produce zero coefficients upon inverse quantization. In this manner, the added stuffing bits will not affect the resulting picture. Note that since the P frame is encoded as intra slices (no non intra macroblocks), adding the new non_intra_matrix will not affect the P frame intra encoded macroblocks. And since all the other macroblocks in the slices of the P frame are generally either skipped (or MC, not coded), the added quantization matrix will not affect them either.

Subsequent to the processing of block 1102, empty slices are generated (block 1104) for those slices of the P frame which are not occupied by the image. If stuffing bits are required, then the number of stuffing bits needed to restore the image data to its original bits positions is calculated (block 1106). Then for each P frame slice of the image, the processing of blocks 1110–1118 is performed. If the vertical position of the slice has been modified, then a new slice header with the new vertical position code is generated (block 1110). The first macroblock of the slice may then modified to reposition the image horizontally to the new position (block 1112). A new "stuffing" macroblock is then created (block 1114) which is configured to add a necessary number of bits to reposition the following image data to its original bits positions. The new stuffing macroblock data is non_intra encoded as described above so as not to affect the resulting picture. The remaining macroblocks of the image are then appended to the slice data (block 1116). Because the original bits positions have been restored, most of the image macroblocks may be appended via a straightforward read from the original slice data locations and store to the new slice data locations. Finally, data following the image data in the slice may be generated (e.g., skipped blocks) (block 1118). It is noted that the processing steps illustrated in FIG. 11 may be performed in a different order and one or more steps, or portions of the steps, may be performed concurrently.

Having provided an overview of the repositioning method, a more detailed treatment is now provided. In the following discussion, let the desired position of the image (e.g., banner advertisement) be denoted (x, y) where the desired position is on a macroblock boundary (i.e. x % 16=y % 16=0). The following describes one embodiment of an algorithm to modify an MPEG P frame so as to place an image in a desired location (x, y) on the screen. Initially, the banner ad may be encoded as an MPEG P frame as rows of intra macroblocks with the starting location being the first column and first row (x=0 and y=0). However, as will be appreciated from the following description, the algorithm is also applicable even when the starting location of the P frame image is non-zero. The P frame is generally encoded with coding parameters chosen so that the combined background I frame and banner P frame are a valid MPEG 2 video stream.

Step 1—Determine Whether Stuffing Data Bits Will be Added

In the context of a television system, a receiving device may include hardware and/or software (i.e., a repositioning mechanism) configured to reposition images which are received via a television broadcast stream. This mechanism is configured to receive a desired repositioning location (x, y) and compare this new location to the location of an image as received. In general, the mechanism will determine whether we are moving the image to a new location x with a different bit position. For example, in an embodiment where the granularity of memory accesses are on byte boundaries, then if the current position x % 8≠new position x % 8, then the bit position will be changed and stuffing bits will be required. If it is determined that stuffing bits will be required, then a non_intra_quantizer matrix will be used and the picture header may be modified in Step 2. On the other hand, if it is determined that no stuffing bits will be required, then a non_intra_quantizer matrix will not be used and Steps 2, 5 and 7 may be skipped.

Step 2—Analyze and Modify the Picture Header of the P Frame

First, the method comprises analyzing the picture header of the P frame to determine whether or not to perform certain modifications. Generally speaking, since the following method may include adding new data (stuffing bits) to the P frame which could potentially affect the resulting picture, steps must be taken to ensure that the added data does not affect the visual impact of the resulting picture in undesirable ways. In one embodiment, any added data is encoded as non_intra data and an appropriate non_intra_quantizer matrix is chosen such that that upon inverse quantization, the DCT coefficients of the added data are either zero or are otherwise negligible. In an MPEG based embodiment, this approach requires analyzing and possibly modifying the picture header to ensure the appropriate non_intra_quantizer matrix is present.

Upon analysis of the P frame picture header, the following approach is used to ensure an appropriate non_intra_quantizer matrix is present.

```
1. IF (q_scale_type = 1) THEN
       a. IF (extension_and_user_data already exists) THEN
               i. IF (using default non_intra_quantizer_matrix) [i.e.,
                  load_non_intra_quantizer_matrix=0], THEN
                  Done with Step 2, go to Step 3.
              ii. ELSE set load_non_intra_quantizer_matrix=1 and load
                  non_intra_quantizer_matrix with all coefficients < 32.
       b. ELSE [extension_and_user_data does not exist]
               i. add extension_and_user_data,
              ii. set load_non_intra_quantizer_matrix=1, and
             iii. add non_intra_quantizer_matrix with all coefficients <32.
2. ELSE [q_scale_type=0]
       a. IF (extension_and_user_data already exists) THEN
               i. set load_non_intra_quantizer_matrix=1 and load
                  non_intra_quantizer_matrix with all coefficients < 16.
       b. ELSE
               i. add extension_and_user_data,
              ii. set load_non_intra_quantizer_matrix=1
             iii. add non_intra_quantizer_matrix with all coefficients <16.
```

Step 3—Generate Empty Slices

In one embodiment, an empty slice may be defined as a slice with the following characteristics:

1. The slice occupies one row of macroblocks; and
2. Except for the first and last macroblocks in a slice, all other macroblocks in the slice are skipped and not coded; or the first and last macroblocks are coded with macroblock_type=001 (MC, not coded) and mvs=0 (zero motion vector), so that the slice macroblocks are a copy of the co-located macroblocks from the I frame.

The remaining steps of the algorithm may be summarized as follows. For each slice including image data:

1. Modify the first macroblock of the slice to position the image in the desired location.
2. Calculate the number of stuffing bits needed to restore the image data to its original bits positions.
3. Construct a new first macroblock inserted before the original first macroblock with selected coefficients to:
   a. Achieve the desired number of stuffing bits.
   b. Ensure the reconstructed coefficients are zero.
4. Append the slice image data.
5. Fill the rest of the slice with either skipped or (MV, not Coded) macroblocks.

Step 4—Modify the Original First MB of Image Slice to Reposition the Image

The first macroblock of the original slice is modified in order to reposition the image to the desired location. Note that because a stuffing macroblock will be inserted before the original first macroblock, the modified original first macroblock will be the second macroblock in the new slice. Modification of the original first macroblock may be performed as follows:

1. Calculate and set the macroblock_address_increment (MBAI) of the MB to (x/16)=n*11+(1 to 11) bits (where n=the no. of MB escape codes needed) to place the image in the new location.
2. Set macroblock_type="000001b" (Intra+mbq).
3. Set the quantizer_scale_code to the same value as the original first MB.

Step 5—Calculate Bit Stuffing Needed

The algorithm calculates the amount of bit stuffing necessary to restore the P frame image data to its original bit positions. Generally speaking, the amount of stuffing bits (sbit) needed may be summarized as follows:

1. IF the first macroblock of the original slice is coded with a quantizer_scale_code THEN
   a. The bit position within the slice of first coefficient of the image data=(# bits in the slice header+# bits in the MB header) % 8=(38+12) % 8=2; and
   b. The number of stuffing bits needed is sbit=7−len (where len is the length % 8 of the new MBAI calculated in step 4.)
2. ELSE
   a. The bit position within the slice of the first coefficient of the image data=(38+6) % 8=4; and
   b. The number of stuffing bits needed is sbit=(1−len) % 8.

We now turn to a discussion of how the above stuffing bit values are determined. Generally speaking, a slice header may be represented as follows:

| Codeword | No of bits | Actual code |
| --- | --- | --- |
| slice_start_code | 32 | "0x000001XX" (hex digits) |
| quantizer_scale_code | 5 | "xxxxxb" |
| extra_bit_slice | 1 | "0b" |

Therefore, the total number of bits in the slice header=32+5+1=38.

Now, depending on whether the first macroblock in the intra slice is coded with quant_scale_code or not, the amount of bit stuffing may vary.

Step 5A—If the First Macroblock is Coded with Quant Scale Code

If the original first macroblock header is as follows:

| Codeword | No of bits | Actual code |
| --- | --- | --- |
| macroblock_address_increment | 1 | "1b" |
| macroblock_type | 6 | "000001b" Intra + mbq |
| quantizer_scale_code | 5 | "xxxxxb" |

Then the bit position (within a byte, where each byte has bits numbered 0–7) of the first coefficient of the first macroblock starts at:

(38 bits (slice header size)+12 bits (macroblock header size)) % 8=50% 8=2.

Assuming x is the desired starting pixel location of the first macroblock of the P frame image, then k=x/16+1 is the macroblock location of the kth macroblock. Using the MPEG macroblock_address_increment variable length code table, the algorithm identifies the Variable Length Code (VLC) VLC(k−1) of the macroblock_address_increment codeword.

Assume in the following discussion that— k−1 is the macroblock address increment number.

VLC(k−1) is the variable length code of the macroblock address increment.

Len is the modular length of VLC(k−1) (i.e., Len=length (VLC(k−1)) % 8).

Sbit is the number of stuffing bits needed.

Then, assuming the bit position of the first coefficient is 2, (len+11+sbit) % 8=2; where 11 is the combined number of bits of macroblock_type and quant_scale_code. Manipulating the above equation we obtain:

$$(len + 11 + sbit)\%8 = (len + 8 + 3 + sbit)\%8$$
$$= (len + 3 + sbit + 8)\%8$$
$$= ((len + 3 + sbit)\%8 + 8\%8)\%8$$
$$[\text{since } (a + b)\%c = (a\%c + b\%c)\%c]$$
$$= ((len + 3 + sbit)\%8 + 0)\%8$$
$$= ((len + 3 + sbit)\%8)\%8$$
$$= (len + 3 + sbit)\%8$$

$$\Rightarrow (len + 3 + sbit)\%8 = 2$$
$$sbit = (2 - 3 - len)\%8$$
$$sbit = (8 + 2 - 3 - len)\%8 \ [\text{since } a\%c = (a + c)\%c]$$
$$= (7 - len)\%8$$

Since len is between 0 to 7, (7−len) is also between 0 to 7, and % 8 can be dropped. Therefore, sbit=7−len.

Given the number of stuffing bits needed is sbit=(7−len), the modified first macroblock (which will become the second macroblock after adding the new stuffing macroblock) then becomes:

| Codeword | No of bits | Actual code |
| --- | --- | --- |
| macroblock_address_increment | n * 11 + (1 to 11) | |
| (where n = the no. of macroblock escape codes needed) | | |
| macroblock_type | 6 | "000001b"Intra + mbq |
| quantizer_scale_code | 5 | "xxxxxb" |

Step 5B—If the First Macroblock is Coded Without a Quant Scale Code

If the first macroblock is coded without quant_scale_code as follows:

| Codeword | No of bits | Actual code |
| --- | --- | --- |
| macroblock_address_increment | 1 | "1b" |
| macroblock_type | 5 | "00011b"Intra |

Then the bit position of the first coefficient of the first macroblock starts at:

(38 bits (slice header)+6 bits (macroblock header)) % 8=44% 8=4.

Because the stuffing bits are generated by a stuffing macroblock (with a different quantizer_scale_code) placed before the original first macroblock, in order to preserve the quantizer_scale_code in the slice header, this original first macroblock is modified as follows:

| Codeword | No of bits | Actual code |
| --- | --- | --- |
| macroblock_address_increment | n * 11 + (1 to 11) | |
| macroblock_type | 6 | "000001b"Intra + mbq |
| quantizer_scale_code | 5 | "xxxxxb" | where the quantizer_scale_code is chosen to be the same as that used in the slice header.

Assuming again that:
k-1: Macroblock address increment number
VLC(k-1): The variable length code of the macroblock address increment
len: Length(VLC(k-1)) % 8: Modular length of VLC(k-1)
sbit: No of bit stuffing needed (len+6+5+sbit) % 8=4

⇒(len+3+sbit) % 8=4

⇒sbit=(1−len) % 8

Therefore, the number of stuffing bits needed is=(1−len) % 8.

Step 6—Generate New Slice Header

If repositioning of the image causes a change in the vertical position of the image, then the vertical position code of the affected slices is modified. The algorithm uses the P frame intra slice information to generate a new slice header. The new slice header generally has the same coding parameters as the original one, except the slice_vertical_position is set to the new location which is y/16+1.

Therefore, the new slice header becomes:

| Codeword | No of bits | Actual code |
| --- | --- | --- |
| slice_start_code | 32 | "0x000001XX" |
| quantizer_scale_code | 5 | "xxxxxb" |
| extra_bit_slice | 1 | "0b" | where XX=y/16+1 represented in hex.

Step 7—Generate a "Stuffing" First Macroblock

In order to create the necessary stuffing bits, the algorithm generates a new first macroblock, a "stuffing" macroblock, with the following bit pattern:

| Codeword | No of bits | Actual code |
| --- | --- | --- |
| macroblock_address_increment | 1 | "1b" |
| macroblock_type | 5 | "00001b"No MC + coded + mbq |
| quantizer_scale_code | 5 | "00001b" |
| macroblock_pattern | 5 | "01011" cbp = 1 (First Y block) |
| First DCT coefficient | sbit | chosen from table in FIG. 12 |
| (choose the first DCT coefficient from the table in FIG. 12 which has a length matching sbit) | | |
| EOB | 2 | "10b" |

In this example, the stuffing macroblock is coded with no motion compensation and with quantizer_scale_code to be 1 so that any coefficient after reconstruction will be 0 and the added macroblock will have no effect on the coded picture. Those skilled in the art will appreciate that it is possible to choose other values and codings which will result in zero coefficients after reconstruction. All such alternatives are contemplated. In this example, the coefficient is chosen from the table in FIG. 12 to provide the number of stuffing bits needed. It is noted that the table in FIG. 12 illustrates but one of many embodiments which may achieve a similar effect. Other selections of code words from the MPEG-2 VLC table may also produce reconstructed coefficients=0. Further, in embodiments using other compression techniques, encoded coefficients may be appropriately chosen in order to produce reconstructed coefficients=0.

In selecting the length of the first DCT coefficient, the following may be observed. The number of stuffing bits, sbit, has been determined as described above. Also, the number of bits in the slice header and the above macroblock (excluding the length of the first DCT coefficient) are determined as well. Based upon this knowledge, it can be shown that the desired length of the first DCT coefficient is equal to sbit as follows:

(38(bits in slice header)+16(bits in macroblock header)+Length of first *DCT* coefficient+2(bits in *EOB*)) % 8=sbit(stuffing bits needed).

Therefore, (56+Length of first *DCT* coeff) % 8=sbit, and the length of first DCT coefficient=sbit.

Note that in one the embodiment, the original P intra slice is encoded with a horizontal position=0. Therefore, if the desired horizontal position (x) is 0, then no bit stuffing is needed—the algorithm can just copy the bits after the slice header.

In the embodiments above, all reconstructed non-intra coefficients are zero as illustrated below. Generally speaking, the reconstruction formula for all non-intra coefficients, c[m][n], may be as described below.

$$c[m][n]=((2*level[m][n]+sign[m][n])*quantizer\_scale \times NonIntra\ Qmatrix[m][n])/32$$

Pursuant to the above algorithm, the DCT coefficient codeword is selected such that level[m][n]=1 and sign[m][n]=−1. Therefore, the coefficient becomes:

$$c[m][n]=(quantizer\_scale \times NonIntra\ Qmatrix[m][n])/32.$$

Given, in a first scenario, the following values:
q_scale_type=1,
quantizer_scale=1, and
NonIntra Qmatrix[m][n]=16 for all m, n, Then the reconstructed coefficients are:

$$c[m][n]=16/32=0 \text{ for all non intra coefficients.}$$

Alternatively, given in a second scenario, the following values:
q_scale_type=0,
quantizer_scale=2,
NonIntra Qmatrix[m][n]=1 for all m, n, Then the reconstructed coefficients are:

$$c[m][n]=(2\times 1)/32=2/32=0 \text{ for all non intra coefficients.}$$

As already noted, zero coefficients are not strictly necessary. Other embodiments may utilize values which produce non-zero coefficients, but which still result in a picture which is not materially affected by the added data.

Step 8—Append Macroblocks

Subsequent to generating a stuffing macroblock, the remaining macroblocks of the image data in the slice are appended following the stuffing macroblock. The first macroblock of the original slice (the second macroblock is the new slice) being modified (if necessary) as described in Step 4. Generally speaking, the macroblocks to be appended may be read from the original slice which is stored in a first buffer, and stored to the new slice in a second buffer. Because the original bit positions of the macroblock data have been restored, a straightforward copy may be used for the majority of the data and bit shifting may be avoided.

Step 9—Generate Rest of Slice

After appending the macroblock data in Step 8, the remaining portion of the slice may be generated. In one embodiment, the remaining macroblocks are skipped and the last macroblock has macroblock_type=001 which is MC, not coded.

Step 10—Repeat for Whole Frame

The algorithm repeats until all the slices that cover the whole P frame banner image have been generated.

Figure 13:
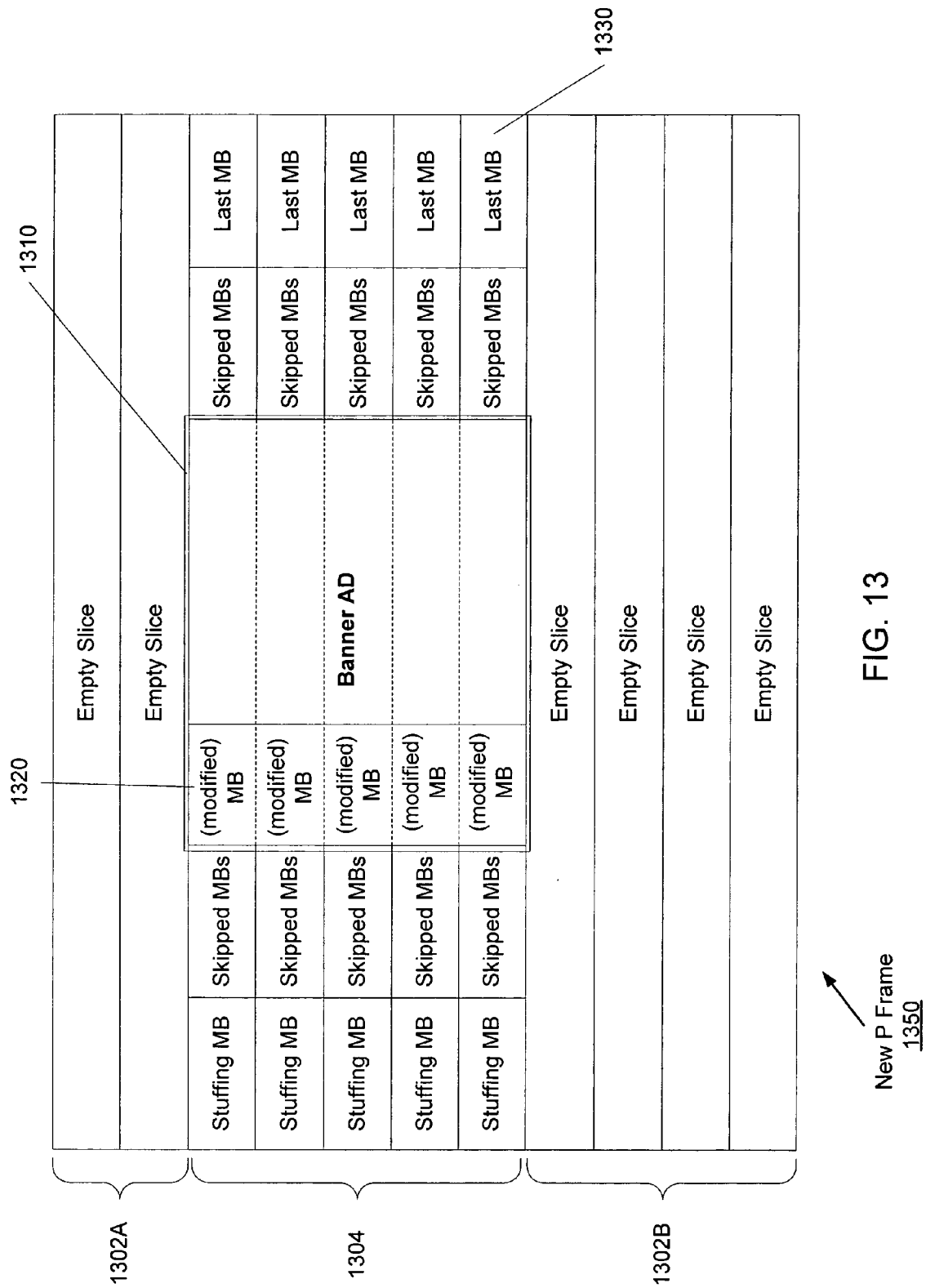
FIG. 13 depicts one embodiment of a P frame after modification.

One example of a final P frame 1350 after repositioning of an image is illustrated in FIG. 13. In the embodiment shown, empty slices 1302A–1302B have been generated to both precede and follow the image 1310. The image 1310 in this example is doubly outlined in order to make it easier to see in the figure. New slices 1304 have been created for those slices which contain image data. If the image has changed position vertically, then the position of slices 1304 which include the image data has changed vis-à-vis the original P frame.

Also shown in FIG. 13 are the potentially modified macroblocks blocks 1320 of the image 1310. In the event the horizontal position of the image has changed, then the illustrated stuffing macroblocks will have been added to slices 1304 and the macroblocks 1320 of the image will have been modified to skip the appropriate number of macroblocks in order to achieve the desired position. Finally, the Last macroblock 1330 in the image slices may indicate a number of macroblocks following the image macroblock data which are to be skipped.

Figure 14:
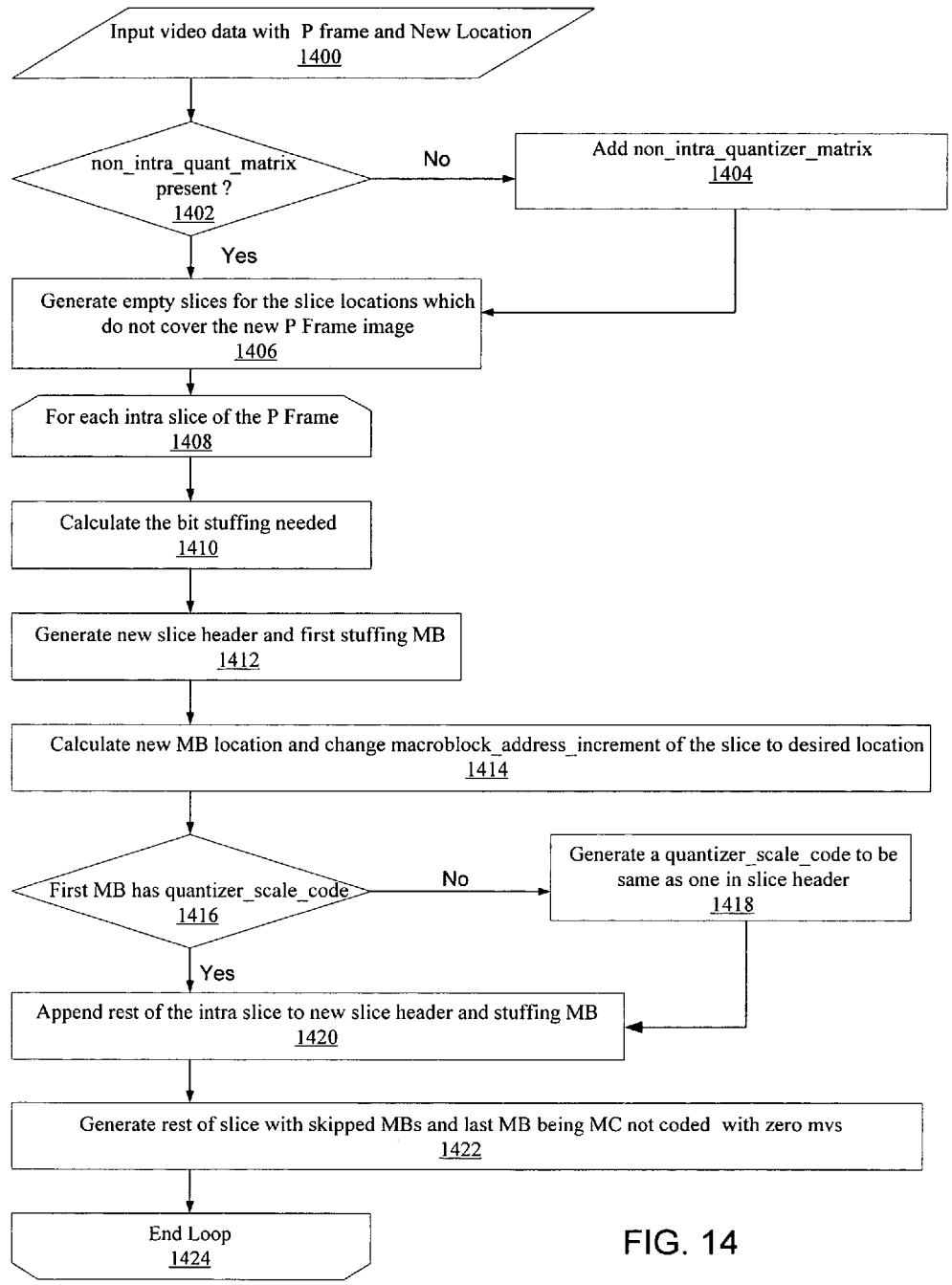
FIG. 14 illustrates one embodiment of a method for repositioning images.

Turning now to FIG. 14, one embodiment of a method for repositioning images as described above is shown. Data describing an intra-coded P frame coded image and a new position for the image is first received (block 1400). This data may be received via broadcast in a television system, via a network such as the Internet, retrieved from a DVD storage medium, or otherwise. Subsequent to receiving the encoded data, the P frame encoded data may be stored in a first location in preparation for further processing. Data describing the new position for the image may be similarly received, may be generated by a locally run application, or may be received in any other suitable manner.

The encoded P frame picture header is then analyzed (decision block 1402) in order to determine whether a non-intra quantizer matrix is being used. Generally speaking, if the new position indicates a change in position of the image to one which will require the addition of new data (e.g., a stuffing macroblock to restore the image data bit positions), then the new data will be coded as non-intra data and a non-intra quantizer matrix will be appropriately chosen to ensure the new data does not adversely affect the decoded image.

If it is determined that a non-intra quantizer matrix is not indicated, an appropriate modification (block 1404) of the picture header may be performed. If the indicated q_scale_type=1, then a non-intra quantizer matrix is added with all of its coefficients set to a value less than 32. On the other hand, if q_scale_type=0, then a non-intra quantizer matrix is added with all of its coefficients set to a value less than 16. Following the modification (if necessary) of the picture header, empty slices are generated (1406) for those portions of the P frame which are not occupied by the image.

Then for each slice of the P frame including the image data, the loop indicated by begin (block 1408) and end (block 1424) blocks are performed. If bit stuffing is needed to restore the image data to its original bit positions, the amount of bit stuffing is determined (block 1410). A new slice header is then generated for the slice under consideration and a stuffing macroblock is created if stuffing bits are needed (block 1412). If the vertical position of the image has changed, then the vertical position code included in the slice header is modified.

After modification of the slice header and generation of a stuffing macroblock, the macroblock address increment of the original first macroblock is modified (block 1414) in order to reposition the image to the desired location. In addition, if the original first macroblock is not coded with a quant_scale_code, then it is modified (block 1418) to include a quant_scale_code with a value equal to that of the slice header. Subsequent to modifying the original macroblock, the modified original first macroblock and the remaining image data macroblocks of the slice are appended (block 1420) following the stuffing macroblock. Finally, the remaining portion of the slice is generated. In one embodiment, the remaining macroblocks of the slice are skipped and the last macroblock is non-MC coded with zero mvs.

In the discussion above, it is generally assumed that images may be repositioned up or down vertically, or to the right horizontally. In such embodiments, the original P frame image may be positioned with horizontal (x) position=0. In this manner, repositioning to any horizontal position may be achieved. However, it is noted that the above method and mechanism may be adapted for the repositioning of images to the left as well. For example, if an original P frame image has a horizontal position greater than zero (i.e., not to the extreme left) and it is desired to reposition the image toward the left, such repositioning may change the original bit positions of the image data. As already described, a stuffing macroblock may be utilized in order to restore the bit positions of the data. However, rather than modifying the macroblock address increment of the original first macroblock, the address increment of the second macroblock may be modified to skip fewer macroblocks. Consequently, the image will be repositioned to the left. Filling out the remainder of the slice may proceed as described above.

Still further, other measures may be undertaken as well. For example, if a desired repositioning would result in part of the image moving beyond the limits of the frame, a predetermined action may be initiated. For example, an error message may be generated, the image may be repositioned as far as possible without exceeding the boundaries, or any other action deemed suitable. Any number of such actions are possible and are contemplated.

Figure 15:
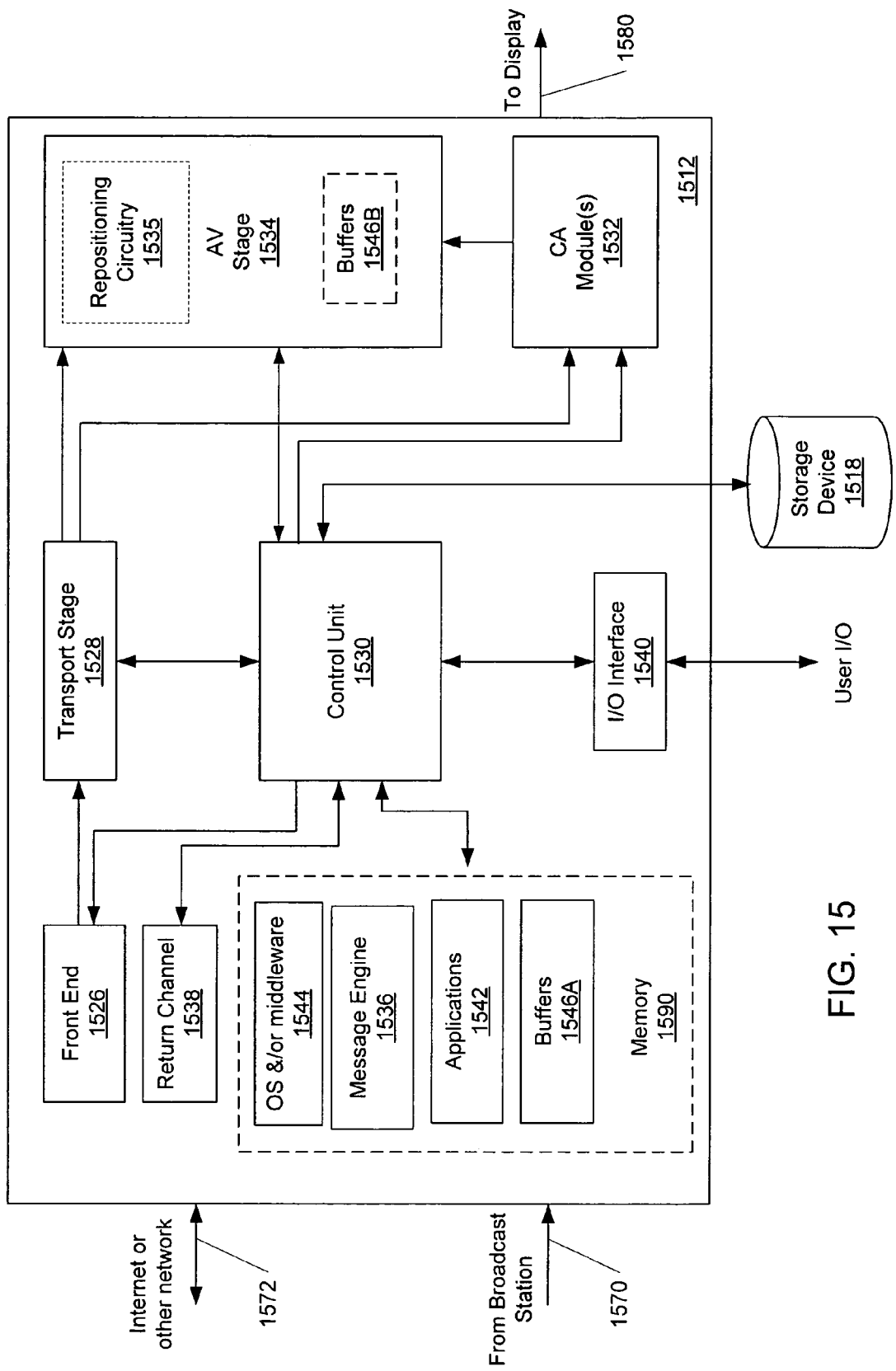
FIG. 15 depicts one embodiment of a device configured to reposition images.

Turning now to FIG. 15, one embodiment of a device 1512 ("client") configured to reposition images in accordance with the foregoing description is shown. While FIG. 15 illustrates the client 1512 in the form of a set top box 1512, other devices are contemplated as well. For example, other devices configured to operate in accordance with the above description may include digital video recorders, a personal digital assistants, personal computers, video game consoles, mobile/cell phones, gambling or entertainment devices, or otherwise. Generally speaking, client 1512 is configured to receive a first signal 1570, such as a broadcast signal, and convey a second signal 1580, such as to a display or recording device. In the embodiment shown, client 1512 is coupled to an external mass storage device 1518. Client 1512 includes a control unit 1530, front end 1526, return channel 1538, transport stage 1528, and AV stage 1534. Also represented is a memory 1590 which may include OS and/or middleware 1544, message processing engine 1536, applications 1542, and buffers 1546A. Also shown is an I/O interface 1540 and conditional access (CA) module(s) 1532. I/O interface 1540 may be configured to detect user interaction via a remote control or other device. Control unit 1530 may comprise a general purpose microprocessor, application specific circuitry, memory (e.g., RAM), and other components.

In one embodiment, applications 1542, OS/middleware 1544, CA module(s) 1532, and message processing engine 1536 comprise code which may be stored in a memory device of set-top box 1512. Additionally, CA module(s) 1532 may comprise software configured to control access to particular programs or services which are accessible by set-top box 1512. While message processing engine 1536 is shown as program code which may be stored in memory 1590 and executed by control unit 1530, it is understood that other embodiments are possible and are contemplated. For example, message processing engine 1536 may comprise circuitry or a combination of hardware and software. For example, message processing engine 1536 may comprise a processing device executing program instructions. Further, message processing engine 1536 may be configured as an external device which may be coupled to a receiving unit. For example, such an external device may comprise an expansion module which is configured to add message processing functionality to a preexisting device.

Generally speaking, client 1512 is operable to receive and decompress signals which may include digital data. Signals which are to be processed may be received via broadcast 1570, Internet 1572, local storage media 1518, or otherwise. The decompressed signals may be converted into analog signals such as PAL, SECAM, or NTSC format signals for television display, or may be in digital format for use by a digital display. As shown in FIG. 15, client 1512 includes front end circuitry 1526 operable to receive audio, video, and other data from a received signal 1570. A received broadcast signal 1570 may be fed into the client 1512 at the front end 1526, which may comprise an analog to digital (A/D) converter and tuner/demodulators. Front end 1526 may select and pass a particular frequency, demodulate it, and convert analog signals to a digital format. While analog data may be converted to digital data, as noted above a received signal may comprise digital data which may require no such conversion. The digitized output may then be conveyed to a transport stage 1528 which further processes the data, conveying a portion of the data to an audio-visual (AV) stage 1534 for display and another portion to control processor 1530. In addition, CA module 1532 may receive data from transport stage 1528 and may conditionally convey a descrambled or other signal to AV stage 1534. Signaling and control information may also be included in the broadcast along with the audio-video data and may be manipulated by software within the client 1512.

Audio-video signals and program control signals received by the client 1512 may include television programs, metadata, and menu selections accessible by a viewer through a user interface, as well as applications that may be executed. A viewer may control the client 1512 in a variety of ways, including through an infrared remote control unit, a control panel on the client, or a device that is used to choose from a menu displayed on the television screen. Selections and entries made by the viewer may be intended for one or more of several applications that are executing on the client. As mentioned above, broadcast signals 1570 are received via front end 1526 and are filtered by transport stage 1528. Unicast or multicast signals may generally be received via return channel 1538. Applications 1542 which execute on the client 1512 may arrive there in a variety of ways. For example, applications may be received via a broadcast signal 1570, via the return channel resource interface 1538, or via storage device 1518. Applications received via storage device 1518 may have been shipped originally with the client 1512 or may have been downloaded previously from another source and stored on storage 1518.

In one embodiment, client 1512 may be configured as a digital set top box for use with a satellite receiver or satellite integrated decoder/receiver that is capable of decoding MPEG video, audio, and data. For example, client 1512 may be configured to receive digital video channels that support broadband communications using Quadrature Amplitude Modulation (QAM), Quadrature Phase Shift Keying (QPSK), Coded Orthogonal Frequency Division Multiplexing (COFDM), or 8-vestigial side band (VSB), and to control channels for two-way signaling and messaging. The digital channels may carry compressed and encoded multi-program MPEG (Motion Picture Expert Group) transport streams. Transport stage 1528 extracts the desired program from the transport stream and separates the audio, video, and data components, which are routed to devices that process the streams, such as one or more audio decoders, one or more video decoders, and optionally to RAM (or other form of memory) or a hard drive. It is to be understood that the client 1512 and storage device 1518 (as well as any data and signals from the broadcast service provider) may be configured to accommodate analog, digital, or both analog and digital data. For storage of received analog data, conversion to digital format may be performed.

Video data may be routed to AV stage 1534 and/or memory 1590. In one embodiment, control unit 1530 is a general purpose processor which operates to execute repositioning code. Such repositioning code may be made part of the operating system, middleware, and/or entirely part of an end user type application. In such an embodiment, transport stage 1528 may convey demultiplexed video data to buffers (1546A–1546B) in memory 1590 or the AV stage 1534. The control unit 1530 then operates to reposition images as described above. Generally speaking, the repositioning process itself may be viewed as an additional preprocessing step prior to decode of the encoded video data. As noted, this preprocessing may entail reading original data from one buffer, modifying the data, and writing the modified data to another buffer. Other embodiments may not rely on a general purpose processor, but may incorporate circuitry 1535 specifically directed to the repositioning of images. As already noted, any suitable combination of hardware and/or software are possible and are contemplated.

Storage device 1518 is optionally coupled to the client 1512 and may be configured to store video, audio, executable code, meta-data, and other data. Storage device 1518 may be internal to client 1512 or connected externally (e.g., through an IEEE 1394–1995 connection) with either a permanent connection or a removable connection. Further, storage device 1518 may comprise any suitable type of storage, such as a hard disk drive, a DVD drive, magnetic tape, optical disk, magneto-optical disk, flash memory, or solid state memory. In addition, more than one storage device such as device 1518 may be attached to the client 1512. The client 1512 and/or storage device 1518 may further be incorporated into a television set. Executable data, such as program instructions, which are stored within storage device 1518 may be retrieved and executed. In one embodiment, retrieved data may be executed or otherwise utilized in synchronization with other applications or received signals, for example corresponding to a game show, commercial, or Internet based on-line game. Alternatively, retrieved data may be executed or utilized independently, such as for video-on-demand, banking, e-mail, or an electronic program guide (EPG).

It is to be understood that the client 1512 and system 150 described herein are intended to be exemplary only. Broadcast system 100 and client 1512 may be different than described herein without departing from the scope of the invention. Further, various components depicted in the client 1512 of FIG. 15 may be combined, such as the placement of the integration of storage device 1518 within client 1512. Numerous alternatives are possible and are contemplated. Still further, while the device shown in FIG. 15 may imply an end user type of device, the method and mechanism described herein may be performed in many places along a transmission stream. For example, repositioning may be performed at a television head-end, at a particular node in a network such as the Internet, or any other suitable location.

In addition to the above, various embodiments may further include receiving, sending or storing instructions and/or data implemented in accordance with the foregoing description upon a carrier medium. Generally speaking, a carrier medium may include transmission media or signals used in broadcast systems and otherwise such as electrical, electro-magnetic, or digital signals, conveyed via a communication medium such as network and/or a wireless link. For example, a network operator may convey signals which describe program instructions via a broadcast system. Alternatively, conveyed signals may include one or more "triggers" which are configured to cause execution of program instructions. A carrier medium may also include storage media or memory media such as magnetic or optical media, e.g., disk, DVD or CD-ROM, volatile or non-volatile media such as RAM (e.g. SDRAM, RDRAM, SRAM, etc.), ROM, etc.

It is to be understood that the above embodiments are intended to be exemplary only. Numerous alternative configurations are possible and are contemplated. It is noted that the method and mechanism described herein may be utilized not only in the context of television systems, but may also be used in the context of web browsers, interactive games, portable computing devices, as well as others. Further, while the following discussion describes the method in the context of an MPEG-2 data stream, the method and mechanism may further be applicable to other data stream formats or standards.

What is claimed is:

1. A method for repositioning images in a video data stream, said method comprising:

storing encoded video data in a first buffer, said data including the representation of a first image at a first position in a displayed image;

determining whether repositioning of the first image to a second position in the displayed image would result in a change of bit positions of the encoded first image data, said bit positions being determined with respect to a first number of bits;

reading said video data from said first buffer;

modifying said video data to reposition said first image;

modifying said video data by generating one or more stuffing bits configured to restore said encoded first image data to said bit positions, in response to determining said repositioning would result in said change of bits positions;

coding said stuffing bits such that upon decode said stuffing bits will not materially affect said displayed image; and storing said modified video data in a second buffer.

2. The method as recited in claim 1, wherein the video data stream is an MPEG-2 data stream, the video data stored in the first buffer comprises an intra-coded P frame, and wherein the modified video data in the second buffer is a modified version of the P frame.

3. The method as recited in claim 2, wherein the first image represented by the P frame is overlaid upon a background image in the displayed image, wherein the background image is conveyed in a separate reference frame.

4. The method as recited in claim 3, wherein said stuffing bits are coded as non-intra data, and wherein the method further comprises generating a non-intra quantization matrix in response to determining said matrix is not represented by said P frame.

5. The method as recited in claim 4, further comprising generating empty slices for slices of the modified P frame which do not include the repositioned first image data, and wherein for each slice of the modified P frame that includes the first image data, the method further comprises:

generating a new slice header with a modified vertical position code to reposition the slice to the second location, in response to determining the second position represents a change in the vertical position of the first image as compared to the first position;

generating a stuffing macroblock, wherein said stuffing macroblock is generated with a first DCT coefficient with length equal to said number of stuffing bits, and wherein upon reconstruction said coefficient is zero;

generate a new address increment of a first macroblock in order to horizontally reposition the first image to the second location;

inserting said stuffing macroblock before said first macroblock;

appending macroblocks which follow said first macroblock from said first buffer to said second buffer; and generating a last macroblock.

6. The method as recited in claim 5, further comprising:
calculating a number of said stuffing bits to be equal to 7 minus the modular length of said address increment, said modular length being determined with respect to said number of bits, in response to determining said first macroblock is coded with a quantizer_scale_code;

calculating a number of said stuffing bits to be equal to the modular length of one minus the address increment, said modular length being determined with respect to said number of bits, in response to determining said first macroblock is not coded with a quantizer_scale_code;

adding a quantizer_scale_code to the first macroblock if the macroblock does not already include a quantizer_scale_code, wherein a value of said quantizer_scale_code is selected to be the same as that of the slice header which corresponds to the macroblock; and setting a macroblock_type of said first macroblock equal to binary value of 000001.

7. The method as recited in claim 5, further comprising:
generating said matrix with all coefficients with a value less than 32, in response to determining a picture header of said P frame has a q_scale_type=1; and generating all said coefficients with a value less than 16, in response to determining said picture header has a q_scale_type=0.

8. The method as recited in claim 5, wherein said stuffing macroblock is generated with macroblock_type equal to binary value 00001 and quantizer_scale_code equal to binary value 00001.

9. A device configured to reposition images in a video data stream, said device comprising:
a storage device configured to store encoded video data, said data including the representation of a first image at a first position in a displayed image; and a repositioning mechanism configured to:
determine whether repositioning of the first image to a second position in the displayed image would result in a change of bit positions of the encoded first image data, said bit positions being determined with respect to a first number of bits;

read said video data from said first buffer;

modify said video data to reposition said first image to said second position;

modify said video data by generating one or more stuffing bits configured to restore said encoded first image data to said bit positions, in response to determining said repositioning would result in said change of bits positions;

code said stuffing bits such that upon decode said stuffing bits will not materially affect said displayed image; and store said modified video data in a second buffer.

10. The device as recited in claim 9, wherein the video data stream is an MPEG-2 data stream and wherein the video data stored in the first buffer comprises an intra-coded P frame, and wherein the modified video data in the second buffer is a modified version of the P frame.

11. The device as recited in claim 10, wherein the first image represented by the P frame is overlaid upon a background image in the displayed image, wherein the background image is conveyed in a separate reference frame.

12. The device as recited in claim 11, wherein said repositioning mechanism is further configured to:
code said stuffing bits as non-intra data; and
generate a non-intra quantization matrix in response to determining said matrix is not represented by said P frame.

13. The device as recited in claim 12, wherein said repositioning mechanism is further configured to generate empty slices for slices of the modified P frame which do not include the repositioned first image data, and wherein for each slice of the modified P frame that includes the first image data, the mechanism is further configured to:
generate a new slice header with a modified vertical position code to reposition the slice to the second location, in response to determining the second position represents a change in the vertical position of the first image as compared to the first position;

generate a stuffing macroblock, wherein said stuffing macroblock is generated with a first DCT coefficient with length equal to said number of stuffing bits, and wherein upon reconstruction said coefficient is zero;

generate a new address increment of a first macroblock in order to horizontally reposition the first image to the second location;

insert said stuffing macroblock before said first macroblock;

append macroblocks which follow said first macroblock from said first buffer to said second buffer; and generate a last macroblock.

14. The device as recited in claim 13, wherein said repositioning mechanism is further configured to:
calculate a number of said stuffing bits to be equal to 7 minus the modular length of said address increment, said modular length being determined with respect to said number of bits, in response to determining said first macroblock is coded with a quantizer_scale_code;

calculate a number of said stuffing bits to be equal to the modular length of one minus the address increment, said modular length being determined with respect to said number of bits, in response to determining said first macroblock is not coded with a quantizer_scale_code;

add a quantizer_scale_code to the first macroblock if the macroblock does not already include a quantizer_scale_code, wherein a value of said quantizer_scale_code is selected to be the same as that of the slice header which corresponds to the macroblock; and set a macroblock_type of said first macroblock equal to binary value of 000001.

15. The device as recited in claim 13, wherein said repositioning mechanism is further configured to:
generate said matrix with all coefficients having a value less than 32, in response to determining a picture header of said P frame has a q_scale_type=1; and generate all said coefficients with a value less than 16, in response to determining said picture header has a q_scale_type=0.

16. The device as recited in claim 13, wherein said mechanism is configured to generate said stuffing macroblock with macroblock_type equal to binary value 00001 and quantizer_scale_code equal to binary value 00001.

17. The device as recited in claim 13, wherein said video data stream is obtained by said device from one of the group consisting of: a television broadcast signal; the Internet; and a local storage medium.

18. A carrier medium comprising program instructions, wherein said program instructions are executable to:
  store encoded video data in a first buffer, said data including the representation of a first image at a first position in a displayed image;
  determine whether repositioning of the first image to a second position in the displayed image would result in a change of bit positions of the encoded first image data, said bit positions being determined with respect to a first number of bits;
  read said video data from said first buffer;
  modify said video data to reposition said first image to said second position;
  modify said video data by generating one or more stuffing bits configured to restore said encoded first image data to said bit positions, in response to determining said repositioning would result in said change of bits positions;
  code said stuffing bits such that upon decode said stuffing bits will not materially affect said displayed image; and
  store said modified video data in a second buffer.

19. The carrier medium as recited in claim 18, wherein the video data stream comprises an MPEG-2 data stream, and wherein the displayed image comprises the first image overlaid upon a background, the first image being represented by an intra-coded P frame and the background image being represented by an I frame.

20. The carrier medium as recited in claim 19, wherein said program instructions are further executable to:
  generate a non-intra quantization matrix in response to determining said matrix is not represented by said P frame;
  generate empty slices for slices of the modified P frame which do not include the repositioned first image data; and
  for each slice of the modified P frame that includes the first image data:
  generate a new slice header with a modified vertical position code to reposition the slice to the second location, in response to determining the second position represents a change in the vertical position of the first image as compared to the first position;
  generate a stuffing macroblock coded as non-intra data, wherein said stuffing macroblock is generated with a first DCT coefficient with length equal to said number of stuffing bits, and wherein upon reconstruction said coefficient is zero;
  modify an address increment of a first macroblock in order to horizontally reposition the first image to the second location;
  insert said stuffing macroblock before said first macroblock;
  append macroblocks which follow said first macroblock from said first buffer to said second buffer; and
  generate a last macroblock.

* * * * *